(12) United States Patent
Fan et al.

(10) Patent No.: US 9,753,686 B2
(45) Date of Patent: Sep. 5, 2017

(54) DOCUMENT PROCESSING SYSTEM, DOCUMENT WORKFLOW APPLICATION AND DOCUMENT PROCESSING METHOD, CONFIGURED FOR FLEXIBLE WORKFLOW

(71) Applicants: Qinlei Fan, Frisco, TX (US); Yuuki Ohtaka, Edgewater, NJ (US)

(72) Inventors: Qinlei Fan, Frisco, TX (US); Yuuki Ohtaka, Edgewater, NJ (US)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/965,401

(22) Filed: Dec. 10, 2015

(65) Prior Publication Data

US 2017/0168765 A1      Jun. 15, 2017

(51) Int. Cl.
*G06F 15/00*         (2006.01)
*G06F 3/12*          (2006.01)
(Continued)

(52) U.S. Cl.
CPC .......... *G06F 3/1275* (2013.01); *G06F 3/1204* (2013.01); *G06F 3/1205* (2013.01);
(Continued)

(58) Field of Classification Search
None
See application file for complete search history.

(56) References Cited

U.S. PATENT DOCUMENTS 7,496,233 B2 *   2/2009   Kirihara .............. G06F 17/2258
                                                           382/229
9,170,821 B1 *   10/2015  Palaniappan ............ G06F 9/44
                           (Continued)

OTHER PUBLICATIONS

U.S. Appl. No. 14/735,251, Tom Haapanen Qinlei Fan, Offline Mobile Capture.

(Continued)

*Primary Examiner* — Barbara Reinier
(74) *Attorney, Agent, or Firm* — Cooper & Dunham LLP

(57) ABSTRACT

Systems, apparatuses and methodologies, for an administrator to configure a flexible document workflow are provided. A workflow creation interface may be provided on a terminal (e.g., via application software) for an administrator to create and register document workflow profiles. Such workflow creation interface may be configured to include a processing location selector to receive selection by the administrator of (i) a processing location amongst plural processing locations or (ii) automatic determination. Such processing location selection may be on a connector-by-connector basis or for the entire workflow. For example, the administrator can register multiple versions of a workflow, to be processed at respective processing locations. As another example, a hybrid workflow can be created in which some workflow connectors or components are performed at one location acid other workflow connectors or components are performed at another location. In another aspect, a workflow validation module may be provided to permit the administrator to test a workflow profile (e.g., a hybrid workflow).

17 Claims, 27 Drawing Sheets

(51) Int. Cl.
*H04N 1/00* (2006.01)
*G06Q 10/06* (2012.01)

(52) U.S. Cl.
CPC .......... *G06F 3/1284* (2013.01); *G06F 3/1287* (2013.01); *G06Q 10/0633* (2013.01); *H04N 1/00204* (2013.01); *H04N 1/00347* (2013.01); *H04N 1/00411* (2013.01); *H04N 2201/0094* (2013.01)

(56) References Cited

U.S. PATENT DOCUMENTS

| | | | | |
|---|---|---|---|---|
| 9,507,634 | B1* | 11/2016 | Shawver | G06F 9/5072 |
| 2003/0103232 | A1* | 6/2003 | Twede | G06F 3/1204 |
| | | | | 358/1.15 |
| 2004/0109191 | A1* | 6/2004 | Ohshima | G06F 3/1208 |
| | | | | 358/1.13 |
| 2008/0316524 | A1* | 12/2008 | Lefebvre | G06F 3/1208 |
| | | | | 358/1.15 |
| 2009/0271872 | A1 | 10/2009 | Ishizuka et al. | |
| 2012/0069394 | A1* | 3/2012 | Ono | G06F 3/121 |
| | | | | 358/1.15 |
| 2012/0200875 | A1 | 8/2012 | Kodimer | |
| 2012/0237244 | A1* | 9/2012 | Yoshikawa | G03G 15/6585 |
| | | | | 399/67 |
| 2012/0243028 | A1* | 9/2012 | Dumitrescu | G06F 3/1275 |
| | | | | 358/1.15 |
| 2014/0258915 | A1 | 9/2014 | Lakra | |
| 2015/0092233 | A1* | 4/2015 | Park | G06F 3/1288 |
| | | | | 358/1.15 |

OTHER PUBLICATIONS

U.S. Appl. No. 14/735,251, Tom Haapanen et al., filed Jun. 10, 2015.
U.S. Appl. No. 15/042,731, Qinlei Fan, System, Apparatus and Method to Process Documents According to Document Processing Profile.
U.S. Appl. No. 15/044,561, Qinlei Fan, System, Apparatus and Method for Document Processing Including Document Stamping.
U.S. Appl. No. 15/042,731 of Qinlei Fan filed Feb. 12, 2016.
U.S. Appl. No. 15/044,561 of Qinlei Fan filed Feb. 16, 2016.
European search report dated May 4, 2017 in connection with corresponding European patent application No. 16201396.5.

* cited by examiner

DOCUMENT PROCESSING SYSTEM, DOCUMENT WORKFLOW APPLICATION AND DOCUMENT PROCESSING METHOD, CONFIGURED FOR FLEXIBLE WORKFLOW

TECHNICAL FIELD

This disclosure relates to document processing systems, apparatuses and methodologies, and more specifically, to such systems, apparatuses and methodologies including provisions to facilitate processing of a workflow at different locations.

BACKGROUND

In the current information age, information technology (IT) tools play a significant role in our daily activities, and there are often discussions of the desirableness of a paperless society. Information technology tools are typically employed as a means to improve efficiency in the workplace (as well as elsewhere). For example, scanners and multi-function printers (MFP) are utilized to convert hardcopy documents into electronic form, thereby decreasing the need for physical storage space and at the same time allowing the information in the paper documents to be transmitted quickly and more readily.

In such circumstances, as well as others, an often-repeated process can be streamlined by employing workflow tools, such that the sequence of operations in the process may be automated. For example, document workflow software is often available to define a document workflow process for a scan document delivery from MFP, such as in an enterprise environment. An example of such document workflow process is (i) scan document, (ii) convert document image to multi-page PDF file (iii) apply watermark, and (iv) send to document management server.

Typically, such document workflow software is installed on a server computer since such server computer can have more processing power and rich software SDK (software development kit) than MFP. However, servers are not cheap and therefore recently, some document workflow software are commonly provided in two varieties: (a) a server edition typically providing full features and high performance; in which the MFP generates scanned document image, then pass it to the server, and the server runs document workflow process; and (b) a server-less edition typically providing relatively limited features and lower performance, in which the MFP generates the scanned document image and also runs the document workflow process.

However, even assuming that cost is not a consideration and that the server edition is obtained by default, not all of the document workflows that the customer uses requires full features and high performance. That is, at least some of the workflows may be very simple workflow that can be handled by MFP resources. On the other hand, if the document processing system is configured to employ the server edition, a simple job may need to wait in the server queue along with more complex jobs that require relatively greater resources and time. If the system permits the MFP to perform the document workflow, such simple jobs could be processed more expeditiously by the MFP and in many instances, the workflow output can be obtained from the MFP than from a server.

SUMMARY

Various tools (for example, a system, an apparatus, application software, a process, etc.) can be provided for an administrator to configure a flexible document workflow. For example, a tool may be provided to enable the administrator to specify a processing location for each workflow component (also referenced herein as a "workflow connector") so as to permit the administrator to optimize, or at least improve, performance of the system as a whole. Such workflow connector may be, for example, convert document to PDF, apply watermark, send to document management server, send e-mail with document attachment, etc.

As another example, the tool may permit the administrator to set a processing location of a specified workflow to be automatically determined (e.g., based on availability of resources, projected completion time, etc.) at time of execution of the workflow.

In an aspect, a workflow creation interface may be provided on a terminal (e.g., via application software) for an administrator to create and register document workflow profiles. Such workflow creation interface may be configured to include a processing location selector to receive selection by the administrator of a processing location amongst plural processing locations or automatic determination. When the administrator selects a processing location, the workflow creation interface displays selectable workflow connectors that can be processed by the selected processing location. Such processing location selection may be on a connector-by-connector basis or for the entire workflow.

For example, if the specified processing location is server-side, the workflow creation interface may provide only a list of workflow connectors that can run on a server-side document flow engine, as the connectors available to create the workflow. Such provision allows the administrator to create a workflow that is processed only on the server-side.

As another example, if the specified processing location is device-side, the workflow creation interface may provide only a list of workflow connectors that can run on MFP-side document flow engine, as the connectors available to create the workflow. Thus, the administrator can create a workflow that is processed only on the MFP device. In this case, the available workflow features are limited compared to server but it does not affect the server's performance or work-load (which may be useful when, e.g., the server is already overloaded and/or has a long backlog of jobs).

On the other hand, when the workflow creation interface permits the administrator to select the processing location on a connector-lay-connector basis, the administrator can create a hybrid workflow in which the processing location of at least one workflow connector of the workflow profile is a first document processing device MFP), and the processing location of another workflow connector of the workflow profile is a second document processing, device (server) that is connected to the first document processing device through a network. In a hybrid workflow, for example, after the scanned document image is processed by the first document processing device, the processed document image is transmitted along with the remaining unprocessed workflow connectors of the registered workflow profile through the network to the second document processing device.

When the administrator selects automatic determination, the workflow creation interface displays all candidate workflow connectors for selection by the administrator. Thus, the administrator can create a hybrid workflow that is processed on both MFP and server. For example, the system may automatically switch the job processing location during the workflow execution. The administrator can take advantage of both MFP-based and server-based workflows. The full feature is still available but the work-load for the server can be lowered by letting MFP process the simple workflow steps.

As another example, the administrator can create two versions of the same workflow, e.g., one version to be performed entirely by the MFP device and another version where the scanned document image is passed to the server-side and then performed entirely server-side. Thus, unlike conventional scan document processing devices. The MFP device may have a registered workflow profile in which the processing location is the multi-function device and also may have another registered workflow profile in which the processing location is a remote document processing device that is connected through a network to the MFP device.

In another aspect, a multi-function document input device (e.g., MFP) is configured to include, in addition to a document scanner that scans a hardcopy document, generates a scanned document image, and submits the scanned document image for further processing according to a selected workflow profile, a workflow distributor that in the case that the selected workflow profile or first workflow connector of the selected workflow profile is associated with a specified processing location, distributes the scanned document image and selected workflow profile to the specified processing location for processing by the specified processing location. On the other hand, in the case that the selected workflow profile or first workflow connector of the selected workflow profile is set to or associated with automatic determination, the workflow distributor determines a suitable processing location amongst the plural processing locations for executing the first workflow connector, and distributes the scanned document image and selected workflow profile to the suitable processing location for processing.

In another aspect, a workflow validation module may be provided to permit the administrator to test a workflow profile, including, for example, in the case of a hybrid workflow, distributing a test document image to a document processing device (set in the workflow profile to perform one or more workflow connectors) to have such device perform said one or more workflow connectors on the test image, and then cause the processed test document image to be transmitted through the network to a second document processing device for processing based on one or more remaining work flow connectors.

In another aspect, the workflow creation interface may be configured to permit the administrator to specify and register a workflow profile that includes at least one transition from (i) a workflow connector having the remote document processing device as the processing location to (ii) next connected workflow connector having the multi-function document input device as the processing location.

As should be appreciated, the workflow creation interface may be configured to permit the administrator to specify and register a workflow profile in which, while the workflow is initiated at the MFP, the processing location can be switched between the MFP and the remote-side multiple times depending on the workflow connectors specified in the registered profile.

BRIEF DESCRIPTION OF THE DRAWINGS

The aforementioned and other aspects, features and advantages can be more readily understood from the following detailed description with reference to the accompanying drawings wherein.

DETAILED DESCRIPTION

Figure 1:
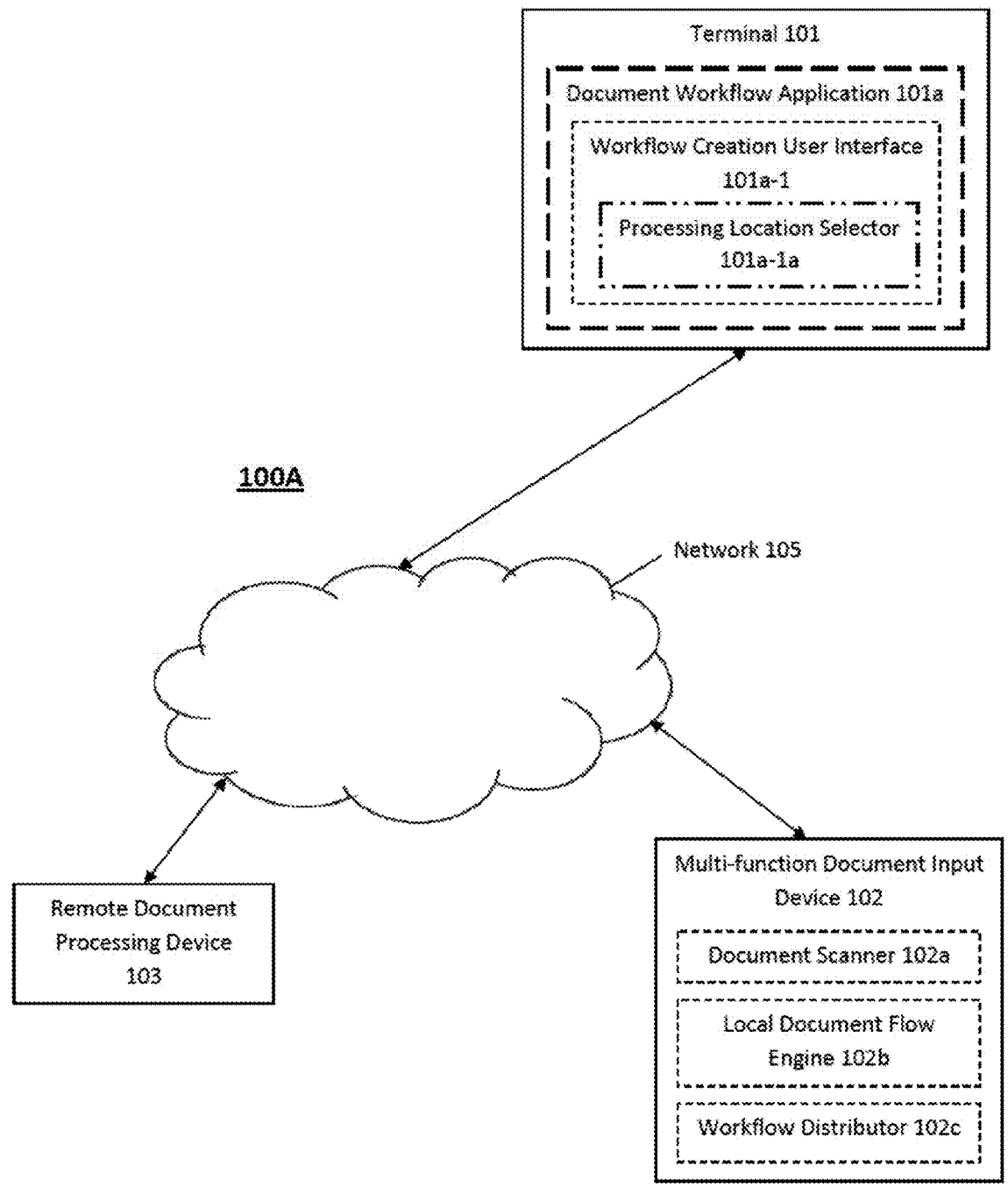
FIG. 1 shows a block diagram of a system including provisions to execute a document workflow for scan document processing, according to an exemplary embodiment.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. In addition, a detailed description of known functions and configurations will be omitted when it may obscure the subject matter of the present invention.

Various tools are discussed herein to facilitate document processing workflow. It should be appreciated by those skilled in the art that anyone or more of such tools may be embodied in software and/or in any of various other ways and thus while various examples are discussed herein, the inventive subject matter of this disclosure is not limited to such examples described herein.

Referring now to the drawings, wherein like reference numerals designate identical or corresponding parts throughout the several v en s FIG. 1 shows schematically a system 100 that includes terminal 101, multi-function document input device 102 and a remote document processing device 103, all of which are interconnected by a network 105.

Figure 2:
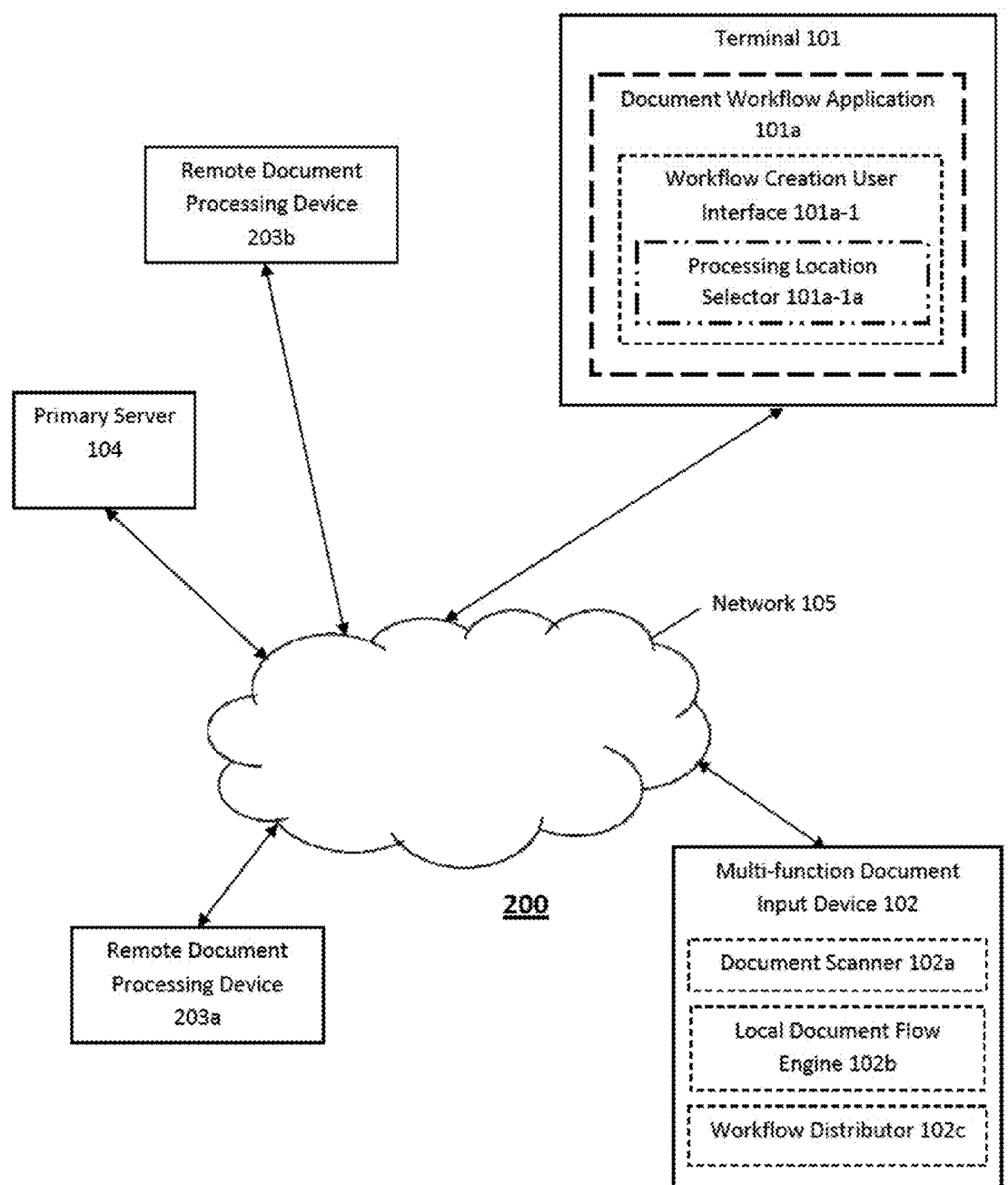
FIG. 2 shows a block diagram of a system including provisions to execute a document workflow for scan document processing, according to another exemplary embodiment.

The terminal 101 can be any computing device, including but not limited to a workstation, notebook or tablet computer, or another information terminal, etc., that can communicate with other devices through the network 105. The terminal 101 is further described infra with reference to FIG. 3. In addition, as the skilled artisan may appreciate, although terminal 103 is shown in FIGS. 1 and 2 and a distinct device, the terminal may alternatively be integral to the server or remote processing device, or the MFP.

A document workflow application 101*a* may be installed onto the terminal 101 to allow a user (e.g., administrator) to create one or more workflow profiles, each of which includes one or more components that correspond to various document processing functions (e.g., PDF converter, image correction, barcode recognition, zonal OCR, etc.) that can be executed on a scanned document image to be processed by, for example, the multi-function document input device 102 an/or remote document processing device 103. Such features of the document workflow application 101*a* may be accessed or set via a workflow creation user interface 101*a*-1.

The workflow creation user interface 101*a*-1 may be a graphical user interface (GUI) by which a user (e.g., administrator) of the terminal 101 can utilize to create one or more workflow profiles. The user may select which document processing functions to be performed via workflow connectors which are presented on the workflow creation user interface 101*a*-1 to allow the user to customize a workflow profile. The user may utilize any of various combination of the workflow connectors to create a workflow profile, provided that each workflow connector in the combination does not conflict with other workflow connectors selected for the workflow. For example, the user may select document processing functions corresponding to (i) converting the scanned document to PDF, (ii) applying a watermark on the scanned document and (iii) emailing the scanned document to create a workflow profile.

The processing location selector 101*a*-1*a* may be accessed via the workflow creation user interface 101*a*-1 and permits the user to select a location (e.g., local device, server-side device, automatic determination at time of execution, etc.) to perform document processing. In other words, it is not necessary to have the document processing functions performed solely by the multi-function document input device 102. For example, it may be that the multi-function document input device 102 is confined to executing only a portion of the document processing functions (e.g., PDF converting, sending by email, etc.) due to, for example, limited processing power, software constraints, low memory, corporate policies, etc., and the multi-function document input device 102 may be connected (e.g., via Internet, LAN, WAN, direct cable, etc.) to an external device (e.g., server, personal computer, laptop, etc.) which can perform document processing functions that the multi-function document input device 102 cannot (or cannot readily) perform, as well as perhaps document processing functions that the multi-function document input device 102 can perform. Consequently, the external device may perform a portion (or all) of the document processing functions specified by the workflow connectors in the workflow profile.

In another example, while it may be that the remote device is a high performance device, it may not be economical to have the high performance device perform every document processing function specified by the user, as some of the specified document processing functions may not require large amount of resources. In other words, time and energy is wasted by having document processing functions that employ little-to-no resources be performed by the high performance device. Thus, the multi-function document input device 102 may instead perform a portion (or all) of the document processing functions specified by the workflow connectors in the workflow profile.

It should be noted that the user is not necessarily-forced to select from a set of available locations. Instead, the user may select an "automatic" option via the processing location selector 101*a*-1*a*. Such "automatic" option causes a device (e.g., multi-function document input device 102) which is currently performing processing on a workflow profile to determine whether the workflow connector should be processed by the device. If the workflow connector, for any reason, should not be performed by the device, the device determines a suitable location that can process the workflow connector and sends the workflow connector to such suitable location. Otherwise, if the device determines that it should perform processing on the workflow connector, the device proceeds to do. Thus, when the user is unable to determine which location to perform the document processing function corresponding to the selected workflow connector, the user may simply select automatic to have the location be selected for him or her.

After the user has selected a location via the processing location selector 101*a*-1*a*, the workflow creation user interface 101*a*-1 presents to the user all of the document processing functions that are available for the specific location. In the case that the user selects the "automatic" option, all of the workflow connectors are shown. For example, the user may select, via the processing location selector 101*a*-1*a* customize a document on a server (e.g., remote document processing device 103). After receiving the selection from the user, the workflow creation user interface 101*a*-1 displays a list of all document processing functions that can be performed by the selected server. Next, the user selects one or more workflow connectors that represent the document processing functions to create a Workflow profile. Once the user has created a workflow profile, he or she may create an identifier for it (e.g., "Workflow 1") and register (i.e. store) the specified workflow on the multi-function document input device 102, to allow a user of the multi-function document input device 102 to specify the registered workflow for processing a scanned document image.

The multi-function document input device 102 includes a document scanner 102*a*, a local document flow engine 102*b* and a workflow distributor 102*c*. In addition, the multi-function document input device 102 may have the ability to communicate with other devices connected to the network 105 via a communication interface (e.g., 507 in FIG. 5). Such communication may entail sending scanned document images to have processing performed thereon by other devices connected to the network 105. Further, the multi-function document input device 102 may also include storage capabilities thereby allowing the multi-function document input device 102 to store workflow profiles received from the terminal apparatus 101 via the network 105.

While this example of this disclosure simply refers, in the interest of brevity, to a single multi-function document input device 102, it should be appreciated that the network environment can have an arbitrary number of multi-function document input devices.

Figure 5:
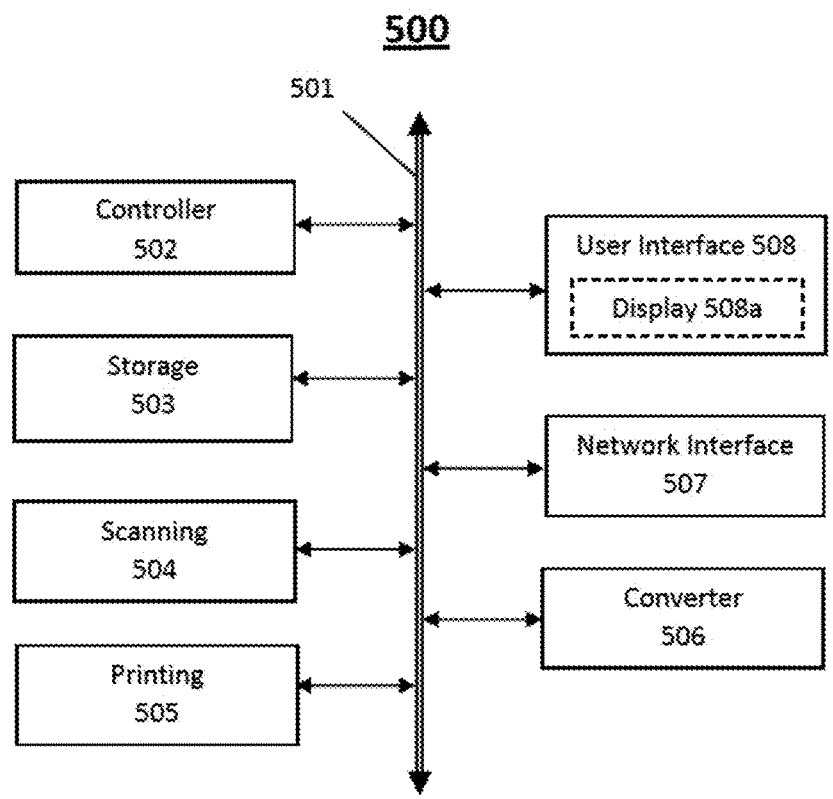
FIG. 5 shows a block diagram of an exemplary configuration of a multi-function device that can be configured via software to operate as the multi-function document input device shown in FIGS. 1 and 2.

In an exemplary embodiment, the multi-function document input device 102 may be an MFP. The term "MFP" is used herein generically to include any multifunction output device having a scanning functionality, in addition to one or more other functionalities (e.g., printing or plotting, copy, fax, scan-to-email, scan-to-store, etc.). The multi-function document input device 102 may be configured as shown in FIG. 5, which is discussed infra.

The document scanner 102*a* scans, via a scanning function, physical (i.e. hardcopy) documents to generate a scarified document image that can be processed by the multi-document input device 102 or a computing device (e.g., remote document processing device 103) depending on a workflow profile selected by the user of the multi-function document input device 102. In an example, a user of the multi-function document input device 102 may perform scanning by inputting hardcopy documents via a glass platen Or an automatic document feeder (ADF).

The glass platen is a component that allows the user to perform scanning. The glass platen is usually a flat pane made up of glass. The user places a sheet such as paper or a photograph onto the glass pane in order for the MFP to scan the sheet by illuminating it with bright light and capturing, the image on the sheet using a charge coupled device (or another image capture). The glass platen is a conventional feature of scanning devices and therefore, in the interest of brevity, is not discussed further.

The ADF is a device that is typically integrated in an MFP to allow the user to perform scanning of multiple sheets without having to manually scan each page one-by-one such as previously mentioned on a glass platen. To facilitate the scanning, the user places one or more sheets on to the ADF. The ADF detector is then used to detect whether the one or more sheets are in place. In that case that they are in place, the ADF starts the scanning process by taking a single sheet off the ADF and scanning it. For cases in which there are two or more sheets on the ADF, the scanning process is initially performed by taking a single first sheet off the ADF and scanning it. The process is repeated for the next sheet beneath the single first sheet and the sheet after that until there are no more sheets left. Consequently, there is no user interaction after the process begins, thereby making the scanning more efficient and quicker.

The local document flow engine 102*b* processes document processing functions specified by the workflow connectors in the workflow profile. However, in one exemplary embodiment, the local document flow engine 102*b* may only perform a subset of all of the document processing functions that are known in the art. In other words, the local document flow engine 102*b* may have limited hardware and/or capabilities thereby preventing the local document flow engine 102*b* from performing all of the document processing functions specified by the workflow connectors. Thus, the local document flow engine 102*b* may perform only document processing functions that are executable by the multi-function document input device 102. In another exemplary embodiment, the multi-function document input device 102 may receive selection of a workflow profile that only specifies that the multi-function document input device 102 as the location to perform processing. In such a case, the local document flow engine 102*b* may be able to execute all of the document processing functions on a scanned document image without the need to send the scanned document image to another location.

The workflow distributor 102*c* allows the multi-function document input device 102 to distribute the scanned document image (scanned by the multi-function document input device 102), including instructions corresponding to the remaining workflow connectors that have not yet been processed, for processing at other locations in the case that one or more workflow connectors in the workflow profile specify one or more locations other than multi-function document input device 102. After the user of the multi-function document input device 102 selects a specific workflow profile for processing a document being or to be scanned, the multi-function document input device 102 performs processing according to the workflow connectors in the selected workflow profile.

In an example, the workflow profile selected by the user may specify that the multi-function document input device 102 performs document processing functions that consume small amounts of resources at the multi-function document input device 102. After such document processing functions are performed by the multi-function document input device 102, the workflow distributor 102*c* may cause the partially processed scanned document image (including the corresponding workflow profile) to be sent to a particular location (e.g., centralized processing document device 103) which proceeds to perform the rest of document processing functions. Subsequently, depending on the workflow profile, the particular location may send back the document to the multi-function document input device 102 for further processing or to another specific location (e.g., send to email).

In another example, it is possible that one or more workflow connectors in the workflow profile selected by the user may specify that the workflow distributor 102*c* is to determine the location in which document processing is to be performed for said workflow connectors (i.e. "automatic" option). Thus, when the multi-function document input device 102 performs processing on a workflow connector which has the "automatic" option, the workflow distributor 102*c* determines a location suitable for performing the document processing function. If such suitable location is the multi-function document input device 102 itself, processing is performed at the multi-function document input device 102. Otherwise, if another location is found to be more suitable (e.g., remote document processing device 103) the workflow distributor 102*c* sends the workflow profile and the partially processed scanned document image to the discovered location.

The remote document processing device 103 performs processing or further processing on one or more scanned document images received from the multi-function document input device 102. The remote document processing device 103 may receive the one or more scanned document images (including the workflow profile) via a communication interface only when the workflow profile selected by the user on the multi-function document input device 102 specifies to have the remote document processing device 103 perform all of or a partial amount of the document processing functions in the workflow profile.

For example, an administrator may specify a workflow profile in which the remote document processing device 103 performs at least part of the document processing process because it may be considered by the administrator that the multi-function document input device 102 may be unable to perform the processing (or can only perform a portion of the processing) due to, for example, limited processing power, software constraints, low memory, corporate policies, lack of hardware, etc. On the other hand, the remote document processing device 103 which has greater processing capabilities than the multi-function document input device 102 may have the ability to perform all of a part of the document processing functions specified in the selected workflow profile that the multi-function document input device 102 cannot. Thus, by this configuration, users are not limited to performing document processing functions that are only available on the multi-function document input device 112.

The network 105 can be a local area network, a wide area network or any type of network such as an intranet, an extranet (for example, to provide controlled access to external users, for example through the Internet), a private or public cloud network, the Internet, etc., or a combination thereof. In addition, the network 105 preferably uses TCP/IP (Transmission Control Protocol/Internet Protocol), but other protocols such as SNMP (Simple Network Management Protocol) and HTTP (Hypertext Transfer Protocol) can also be used. How devices can connect to and communicate over networks is well known in the art and is discussed for example, in "How Networks Work", by Frank J. Derfler, Jr. and Les Freed (Que Corporation 2000) and "How Computers Work", by Ron White, (Que Corporation 1999), the entire contents of each of which are incorporated herein by reference.

FIG. 2 shows schematically a system 200, according to another exemplary embodiment. The system 200 is similar to the system 100 of FIG. 1 except that the system 200 additionally includes a primary server 104 and additional remote document processing devices (e.g., remote document processing device 203*a* and remote document processing device 203*b*).

The primary server 104 assists the multi-function document input device 102 in searching for a centralized processing device (e.g., remote document processing device 203*a* and remote document processing device 203*b*) that is available to process workflow profiles. For example, it may be that there may be multiple remote document processing devices in a network. However, not all of them are available to process workflows due to the fact that, for example, one or more remote document processing devices may be fully engaged in processing other workflow profiles, may be offline, or may be simply malfunctioning. Thus, when the multi-function document input device 102 receives an instruction to perform specific workflow profile specifying a centralized processing device at which processing is to be performed, the multi-function document input device 102 communicates with the primary server 104 for information on which of the remote document processing devices in the network can process the specific workflow profile.

In response to the inquiry, the primary server 104 communicates with a first centralized processing device (e.g., remote document processing device 203*a*). In the case that the first centralized processing device is able to process the workflow, the primary server 104 informs the multi-function document input device 102 accordingly thereby causing the multi-function document input device 102 to send the scanned document image along with the workflow profile to the first centralized processing device. Otherwise, the primary server 104 searches for a second first centralized processing device (e.g., remote document processing device 203*b*) and repeats the process.

In an example, the primary server 104 may have communicated with a remote document processing device 203*a* to determine whether the remote document processing device 203*a* can process a workflow. However, the remote document processing device 203*a* sends back a response informing the primary server 104 that it is not available. Accordingly, the primary server 104 communicates with another remote document processing device (e.g., 203*b*) which in turn informs the primary server 104 that it is available. The primary server 104 informs the multi-function document input device 102 that the remote document processing device 203*b* is available, which prompts the multi-function document input device 102 to send the workflow profile along with the scanned document image to the centralized document processing device 203*b*. It should be noted that while system 200 only shows two remote document processing devices (e.g., 203*a* and 203*b*), it is possible to have a plurality of remote document processing devices in the network.

Otherwise, operations of the system 200 are similar to those discussed in connection with the corresponding elements of the system 100 of FIG. 1.

Figure 3:
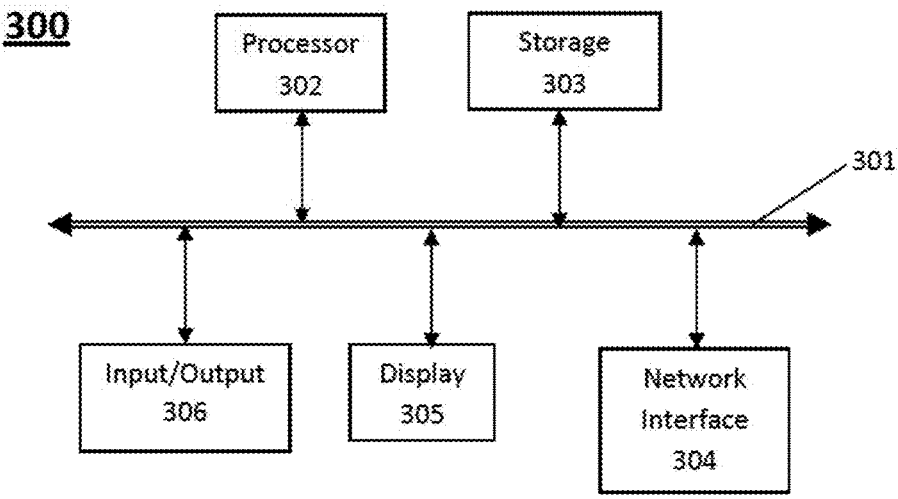
FIG. 3 shows a block diagram of an exemplary configuration of a computing device that can be configured via software to operate as the document processing devices shown in FIGS. 1 and 2.

FIG. 3 shows an exemplary constitution of a computing device that can be configured (for example, through software) to operate (at least in part) as the remote document processing device and server of FIGS. 1 and 2. In FIG. 3, apparatus 300 includes a processor (or central processing unit) 302 that communicates with a number of other components, including memory or storage part 303, network interface 304, display 305 and other input/output (e.g., keyboard, mouse, etc.) 306, by way of a system bus 301. The apparatus 300 may be a special-purpose device (such as including one or more application specific integrated circuits or an appropriate network of conventional component circuits) or it may be software-configured on a conventional server computer, computer workstation or personal computer with sufficient memory, processing and communication capabilities to operate as a server, as should be appreciated to those skilled in the relevant arts.

In the apparatus 300, the processor 302 executes program code instructions that control device operations. The processor 302, memory/storage 303, network interface 304, display 305 and input/output 306 are conventional, and therefore in order to avoid obfuscating the inventive aspects of this disclosure, such conventional aspects are not discussed in detail herein.

The apparatus 300 includes the network interface 304 for communications through a network, such as communications through the network 105 with the terminal apparatus 101 and other devices in FIGS. 1 and 2. However, it should be appreciated that the subject matter of this disclosure is not limited to such configuration. For example, the apparatus 300 may communicate with client terminals through direct connections and/or through a network to which some components are not connected. As another example, the apparatus 300 does not need to be provided by a server that services terminals, but rather may communicate with the devices on a peer basis, or in another fashion.

The apparatus 300 of the present disclosure is not limited to a server or computer, but can be manifested in any of various devices that can be configured to communicate over a network and/or the Internet.

Figure 4:
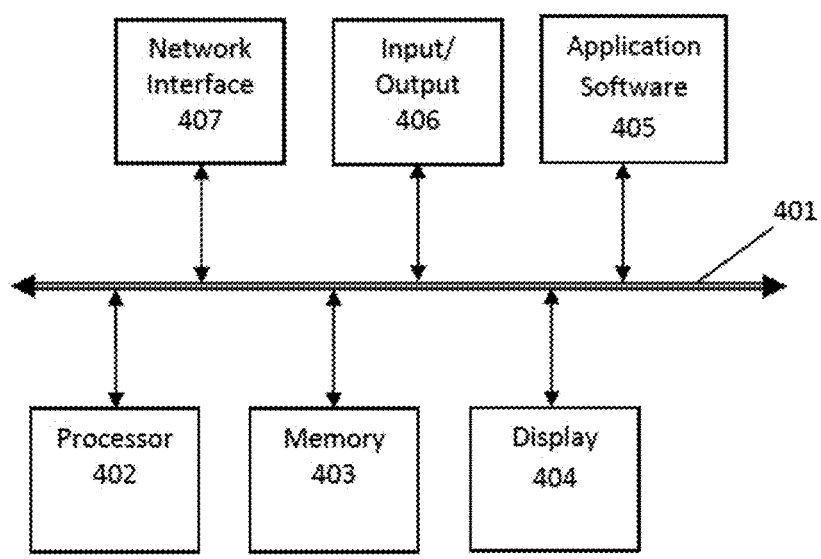
FIG. 4 shows a block diagram of an exemplary configuration of a terminal that can be configured via software to operate as the terminal shown in FIGS. 1 and 2.

An exemplary constitution of the terminal apparatus 101 of FIGS. 1 and 2 (for example, as a computer) is shown schematically in FIG. 4. In FIG. 4, apparatus 400 includes a processor (or central processing unit) 402 that communicates with a number of other components, including memory 403, display 404, application software 405, input/output (such as keyboard, mouse, touchpad, stylus, microphone and/or speaker with voice/speech interface and/or recognition software, etc.) 406, network interface 407, by way of an internal bus 401.

The memory 403 can provide storage for program and data, and may include a combination of assorted conventional storage devices such as buffers, registers and memories [for example, read-only memory (ROM), programmable ROM (PROM), erasable PROM (EPROM), electrically erasable PROM (EEPROM), static random access memory (SRAM), dynamic random access memory (DRAM), non-volatile random access memory (NOVRAM), etc.].

The network interface 407 provides a connection (for example, by way of an Ethernet connection or other network connection which supports any desired network protocol such as, but not limited to TCP/IP, IPX, IPX/SPX, NetBEUI, etc.) to the network to which the computer 400 is connected (e.g., network 105 of FIGS. 1 and 2).

Additional aspects or components of the computer 400 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

FIG. 5 shows a schematic diagram of a configuration of a scanning device as an MFP (multi-function printer or multi-function peripheral), which can be any apparatus that has provisions (such as, for example, via a microprocessor chip or a collection of devices having varying degrees of integration) to perform one or more functionalities in addition to scanning a hardcopy document. The MFP 500 shown in FIG. 5 includes a controller 502, and various elements connected to the controller 502 by an internal bus 501. The controller 502 controls and monitors operations of the MFP 500. The elements connected to the controller 502 include storage 503 (for example, random access memory, read-only memory, hard disk drive, portable storage media drive such as for optical discs, magnetic discs, magneto optical discs, etc., semiconductor memory cards, combinations of storage media, etc.), scanning 504, printing 505, a converter 506, a network interface (I/F) 507, and a user interface 508.

Storage 503 can include one or more storage parts or devices [e.g., a read only memory (for example, ROM, PROM, EPROM, EEPROM, etc.), a random access memory (RAM), a hard disk drive (HDD), portable media (for example, floppy disk, optical disc, magnetic discs, magneto-optical discs, semiconductor memory cards, etc.) drives], and program code instructions can be stored in one or more pails or devices of storage 503 and executed by the controller 502 to carry out the instructions. Such instructions can include instructions for performing specified functions (such as printing, scanning, faxing, copying, e-mailing, etc.) of the MFP 500, to enable the MFP 500 to interact with a terminal, as well as perhaps other external devices, through the network interface 507, and interactions with users through the user interface 508.

The network interface 507 is utilized by the MFP 500 to communicate with other network-connected devices such as a terminal, a server and receive data requests, print jobs, user interfaces, and etc.

The user interface 508 includes one or more electronic visual displays that display, under control of controller 502, information allowing the user of the MFP 500 to interact with the MFP 500. The electronic visual display can be any of various conventional displays (such as a liquid crystal display, a plasma display device, a cathode ray tube display, etc.), but preferably is equipped with a touch sensitive display (for example, liquid crystal display) and is configured to provide a GUI (graphical user interface) based on information input by an operator of the MFP 500, so as to allow the operator to interact conveniently with services provided on the MFP 500, or with the MFP 500 serving as terminal for accessing electronic data or other content through the network. User interfaces or other contents received through the network via the network interface 507 can be displayed on the display screen.

The display screen does not need to be integral with, or embedded in, a housing of the MFD 500, but may simply be coupled to the MFD 500 by either a wire or a wireless connection. The user I/O 508 may include keys and/or buttons (such as graphical keys or buttons, or other graphical elements, of a GUI on a touchscreen display 508) for inputting information or requesting various operations. Alternatively, the user I/O 508 and the display screen may be operated by a keyboard, a mouse, a remote control, voice recognition, or eye-5 movement tracking, or a combination thereof.

Since the MFD 500 is typically shared by a number of users, and is typically stationed in a common area, the MFD 500 preferably prompts the user to supply login credentials or authentication information, such as user name (or other user or group information), password, access code, etc. The user credentials may also be stored for the session and automatically supplied if access to other devices through the network requires it. On the other hand, such other devices may prompt the user to supply other user credentials through the user interface.

Other methods of authentication may also be used. For example, the MFD 500 may be equipped with a card reader or one or more biometrics means (such as comparing fingerprints, palm prints, voice or speech, retinas or irises, facial expressions or features, signature, etc.). The MFD 500 may communicate the user credentials, provided in the manners discussed above, to other devices or applications connected to the MFD 500 via a network (e.g., the network 105 of FIGS. 1 and 2) for determining authorization for performing jobs.

Scanning 504 printing 505, and network interface 507 are otherwise conventional, and therefore, a detailed description of such conventional aspects is omitted in the interest of clarity and brevity. The MFP 500 can have any or all of the functions of similar devices conventionally known, such as for scanning, editing and storing images, sending a fax, sending and receiving e-mails with or without attachments, accessing files by FTP or another protocol or facility, surfing the Web, scan-to-folder, scan-to-email, etc. Further, multi-functional devices or multi-function peripheral devices can play a prominent role to convert hardcopy documents to electronic documents.

Figure 6:
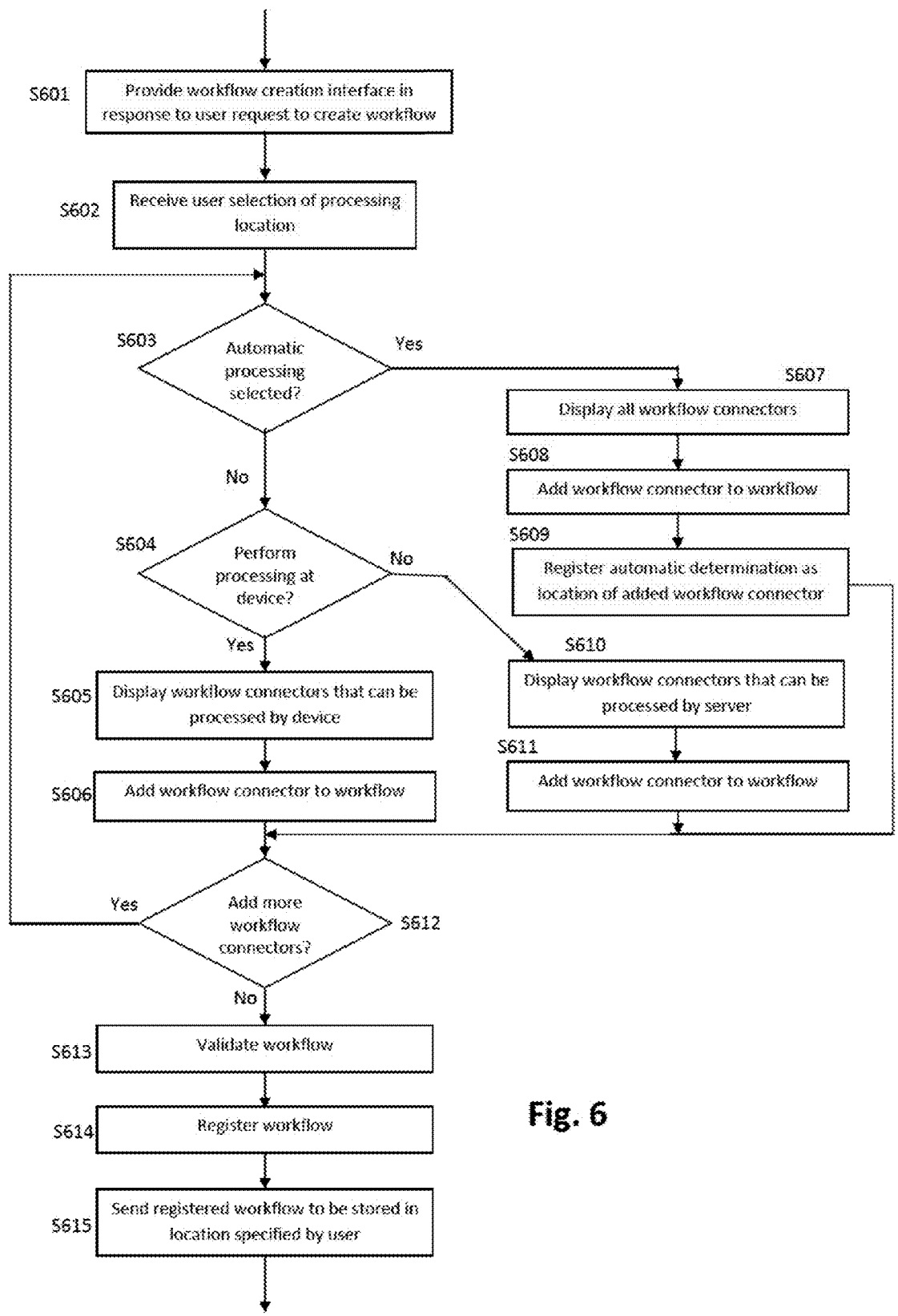
FIG. 6 shows a flow chart of a method that can be performed in the system shown in FIG. 1 or in the system shown in FIG. 2.

FIG. 6 shows a method or process performed by a document workflow application (e.g., 101*a*) on a terminal apparatus (e.g., 101), according to an exemplary embodiment.

In an example of a process discussed below with reference to FIGS. 7A-7K, a user (e.g., administrator) may utilize a document workflow application (e.g., document workflow application 101*a*) on a terminal (e.g., terminal apparatus 101) to create a workflow that can be accessed and utilized by users of a multi-function document input device (e.g., device 102 in. FIGS. 1 and 2). Such workflow allows automation of the processing to be performed to a scanned document image as a series of operations to the document image.

For example, in an organization, most users in an accounting department may scan documents according to one set of configurations (size: 8.5×11, resolution: 300 dpi, destination: scan-to-email) while most users in a legal department may scan documents according to another set of configurations (size: A4, resolution: 600 dpi, password protect or encryption, destination: scan-to-server). Regardless of which sets of configuration is selected, a user of an MFP in a conventional system may need to utilize multiple user interface screens to obtain the desired processing of a scanned document image, thereby making it inconvenient for the user who must constantly switch from one screen to another. On the other hand, by creating a workflow profile that encompasses the set of configurations, the user may not need to go through multiple user interface screens. In other words, by merely performing one action (e.g., selecting a workflow profile), the user can drastically reduce the amount of time spurt at the multi-function document input device.

In the aforementioned example, the set of configurations for accounting (i.e. size: A4, resolution: 600 dpi, destination: scan-to-server) may be combined into one workflow profile called "Accounting Workflow". Thus, an accounting user, instead of going through multiple screens, can merely access the workflow profile (e.g., via icon on touch screen or button) to perform the desired scanning. Similarly, the set of configurations for the legal department (i.e. size: A4, resolution: 600 dpi, password protect or encryption, destination: scan-to-server) may be organized into one workflow called "Legal Workflow" and, like the accounting user, the legal user can merely access the workflow profiles to perform the desired scanning. Consequently, due to presence of workflow profiles, the time spent at the MFP for each user may be reduced significantly.

Figure 7A:
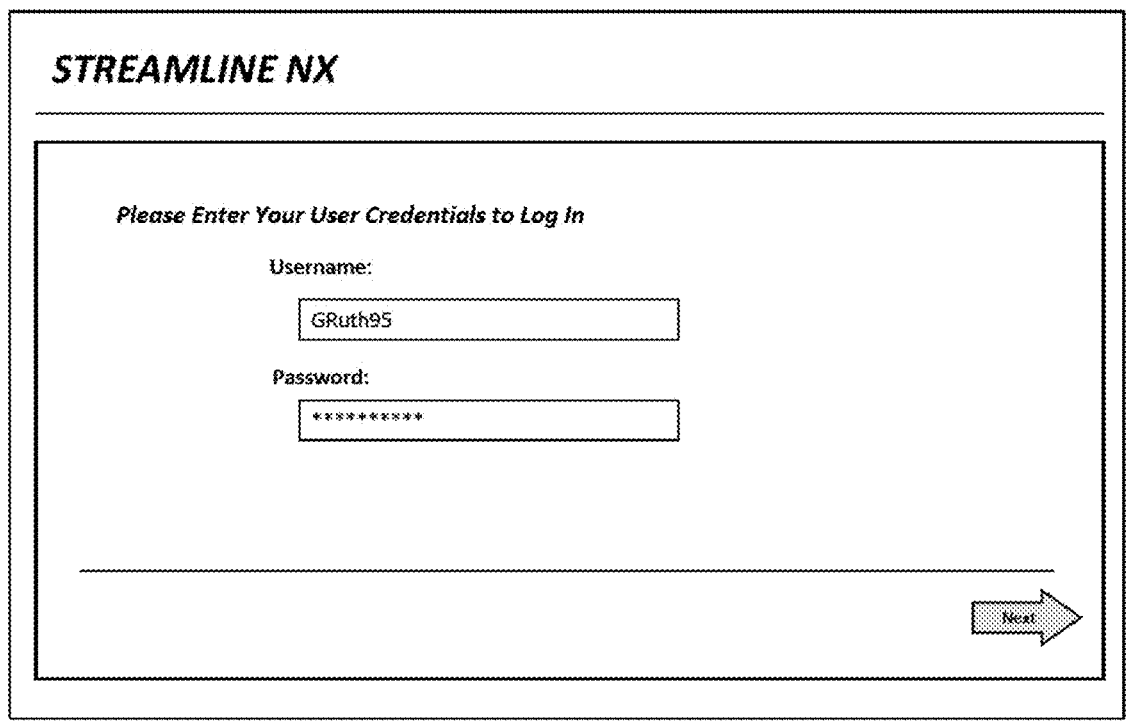
FIGS. 7A-7K show examples of user interface screens that can be provided by a document workflow application.
Figure 7B:
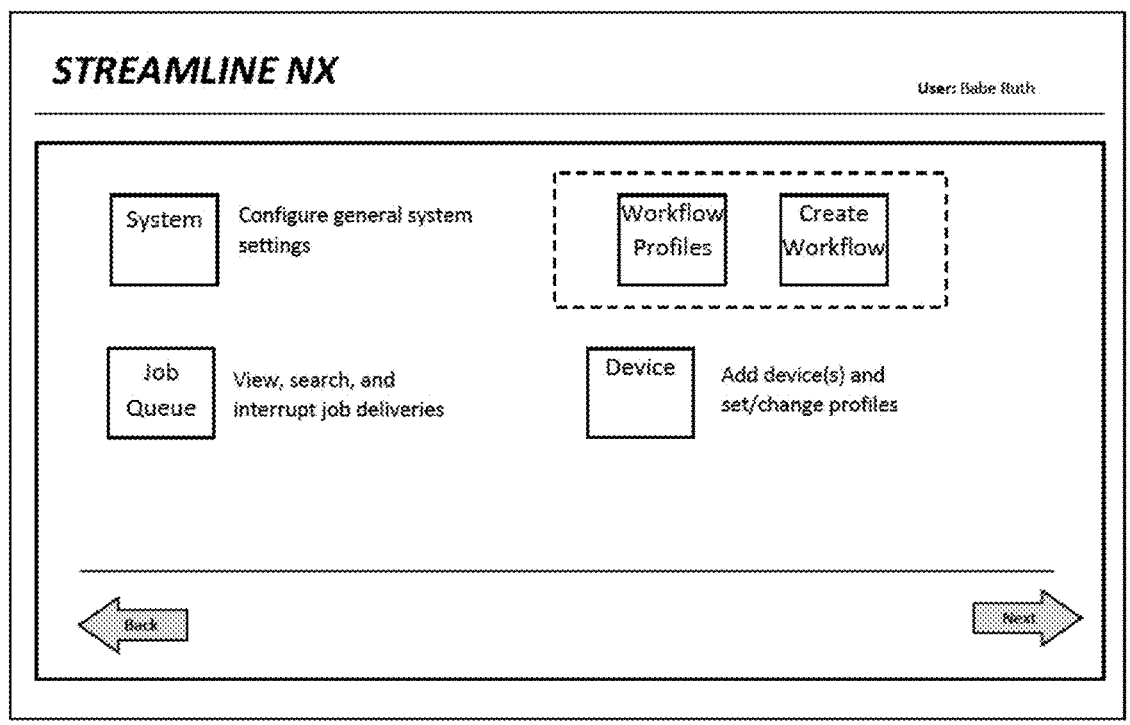

To create such workflow profiles, the user (e.g., administrator) of the terminal may first access the document workflow application by logging in through a user interface, such as shown in FIG. 7A, by inputting user credentials which may include a username and password. After authenticating the user credentials, the asset management application presents the user with a user interface screen, such as shown in FIG. 7B. Here, the use may select to perform multiple tasks such as, for example, creating a workflow profile.

Figure 7C:
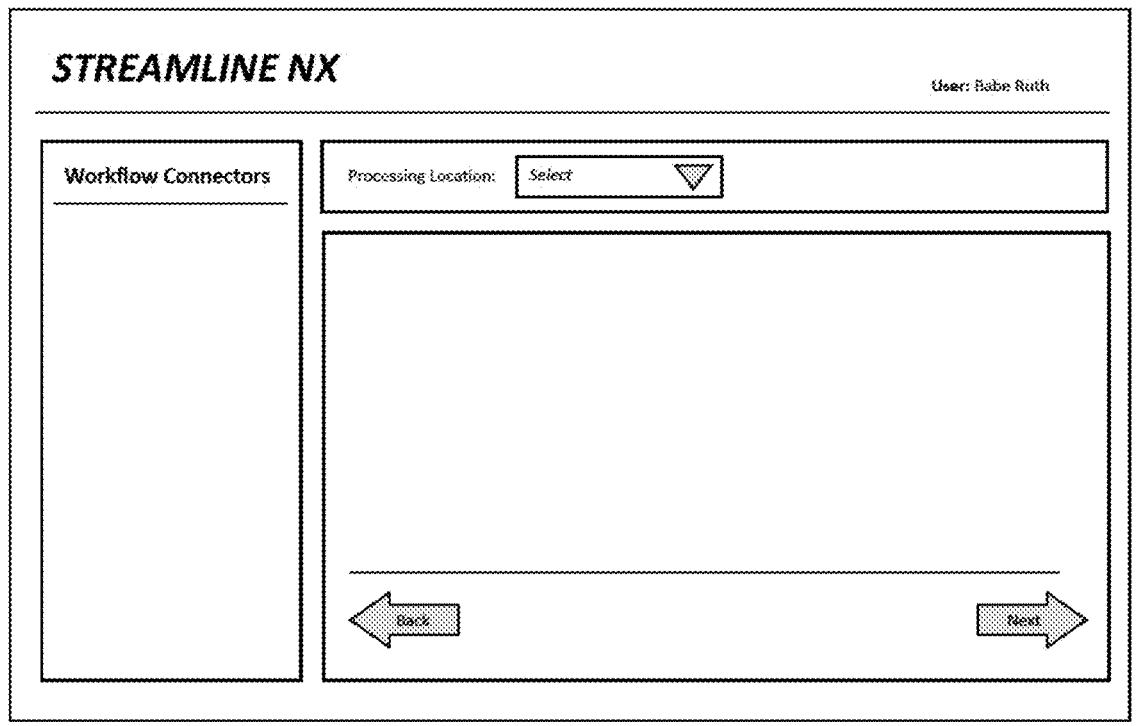

When the user selects the "Create Workflow" option in the document workflow application, the document workflow application presents to the use, a workflow creation user interface screen (step S601) via a GUI, such as shown in FIG. 7C. Such workflow creation user interface includes an option for a user which location (e.g., server, PC, MFP, printer, etc.) should perform processing on the workflow profile. However, it should be noted that some document processing functions (e.g., barcode recognition, image correction, zonal OCR, send-to-email, etc.) cannot be performed in one location (e.g., multi-function document input device), but may be performable at another location (e.g., server).

For example, the workflow profile created by the administrator may be intended for use on a multi-function document input device. However, not all of the document processing functions may be performable by the multi-function document input device. This may be due to the fact that the multi-function document input device may not have enough processing power or required hardware to perform the document processing functions specified by the user. Instead, such specified document processing functions may be performed at another location which has such capabilities (e.g., server). In this case, it may be that many of the workflow profiles which the administrator wishes to select can be only performed by a particular server. Thus, the administrator may select to perform processing only at a server. In addition, the administrator may also have option to have the multi-function document input device determine the location to perform the document processing functions corresponding to a workflow connector that was set as "automatic". In other words, when the user is provided with multiple locations which can perform the same document processing functions, the user is not required to select a particular location out of the multiple locations (since the user may not be sure which is the best location to perform processing).

Figures 1, 7D:
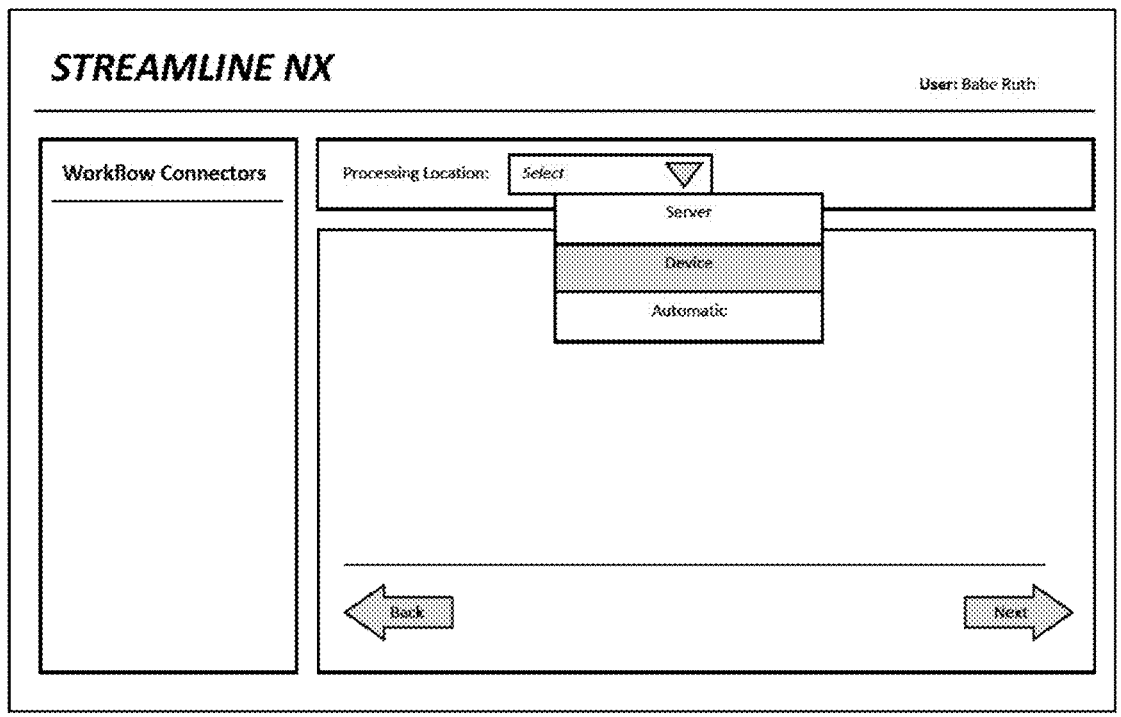
Figures 2, 7D:
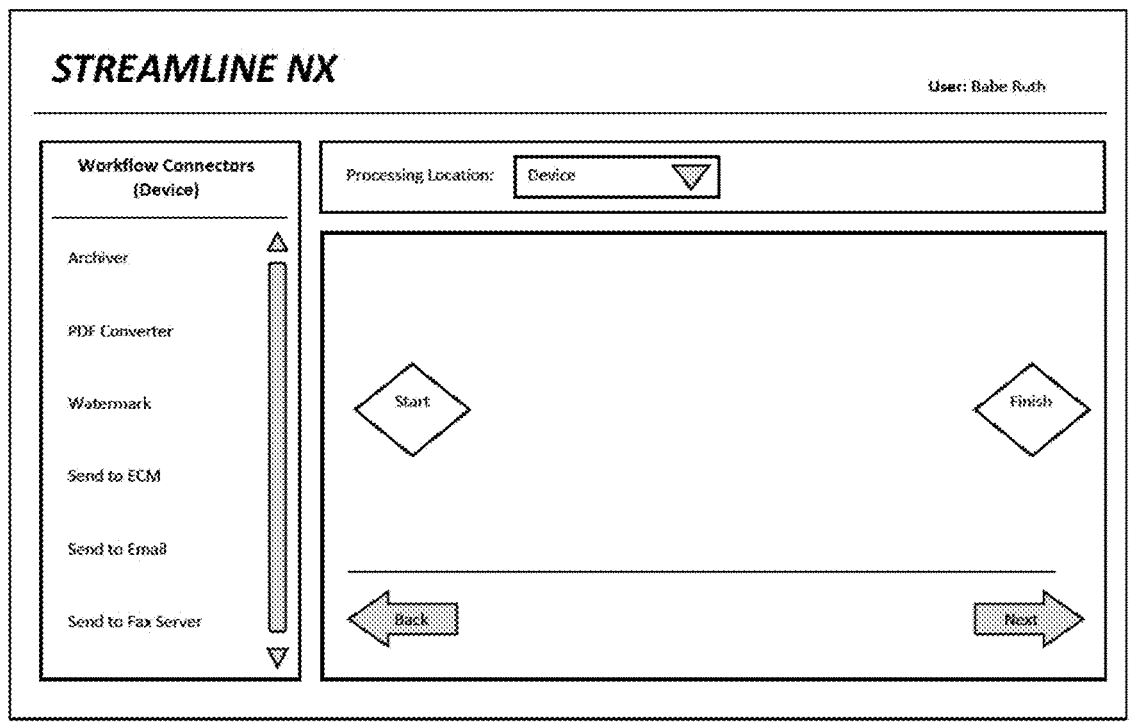
Figures 3, 7D:
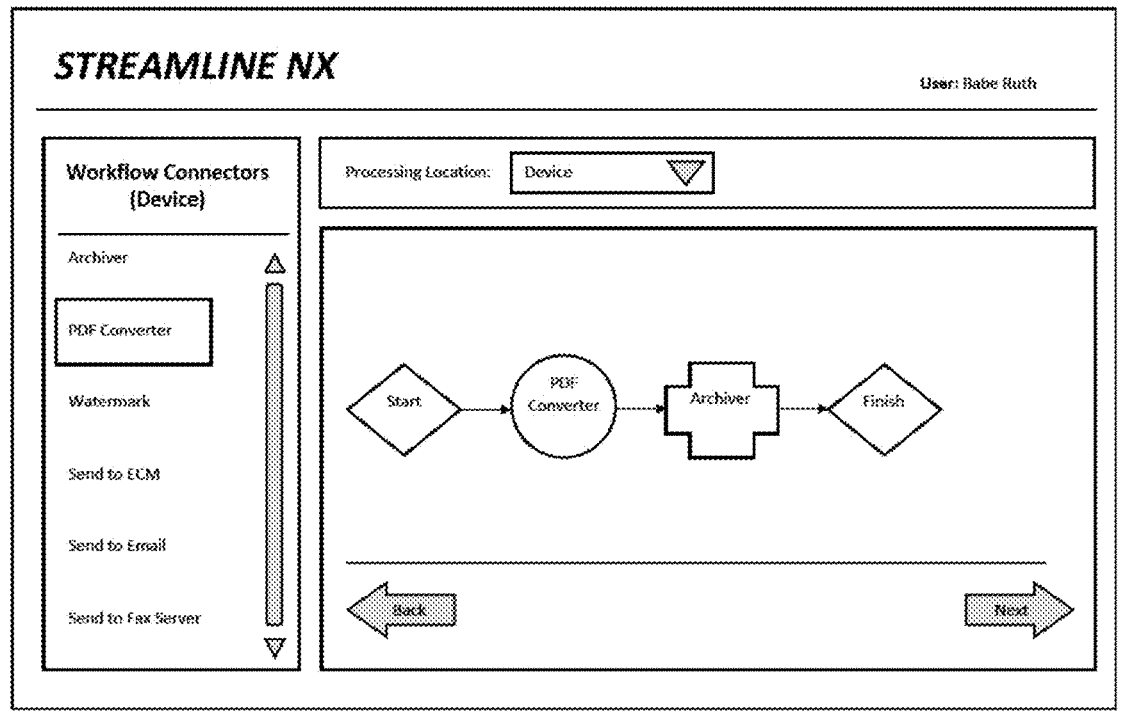

The document workflow application determines whether the user wishes to create a workflow profile having one or more workflow connectors set for "automatic" processing (step S602) by detecting the selection made by the user from a drop-down menu identified by the label "Processing Location". In this case, since the user has not selected to perform "automatic" processing (step S602, no), but has selected to perform processing at a particular location instead (step S603), the document workflow application determines which particular location the processing is to be performed (step S604). In the case that the user has selected to perform processing at a local device (e.g., multi-function document input device) by selecting "Device" from the drop-down menu labeled "Processing Location" (step S604, yes), such as shown in FIG. 7D-1, the document workflow application presents the user with all workflow connectors that can be processed by the local device (step S605), such as shown in FIG. 7D-2. Thus, the document workflow application can add workflow connectors selected by the user to the workflow profile (step S606).

In an exemplary embodiment, the section in which the workflow connectors are displayed to the user may include a "Start" icon and an "End" icon, both of which designate the direction that the workflow is to flow in. In another exemplary embodiment, each of the workflow connectors may be displayed as a different shape to signify a different type of workflow connector function. For example, the "Zonal OCR" workflow connector is represented as a parallelogram, while the "Send to ECM" workflow connector is displayed as a pentagon. By configuring the workflow connectors to be different shapes, the user can easily identify which document processing functions (represented by workflow connectors) are currently in the workflow profile thereby reducing the possibility of errors when the workflow profile has many workflow connectors.

It should be noted that there may be many methods of adding a workflow connector to a workflow profile. In one embodiment, the user may simply click on an identifier corresponding to the document processing function that he or she wants thereby causing a workflow connector (e.g., icon) to appear. By clicking on another document processing function identifier, a second workflow connector (i) appears right after the first workflow connector and (ii) is automatically connected to the first workflow connector. In another embodiment, the user may be able to move the workflow connectors to different locations (i.e. different order) in the workflow. Thus, if the user made a mistake by placing the workflow connectors in an illogical/invalid order or in an order that is not consistent with the wishes of the user, the user can fix this since the document workflow application includes a GUI which supports moving the workflow connectors.

In another exemplary embodiment, the workflow profile created by the user may include entirely of workflow connectors that are to be processed only by the multi-function document input device, such, as shown in FIG. 7D-3. One example of a reason why the user would rather have the workflow be performed at the multi-function document input device instead of a remote document processing device is because the document processing functions that make up the workflow may require very little processing. In other words, not much power, resources or time is needed to perform each of the workflow connector functions in the workflow. Thus, it would be wasteful to have a remote document processing device use its power, resources or time to perform menial workflows.

Figures 1, 7E:
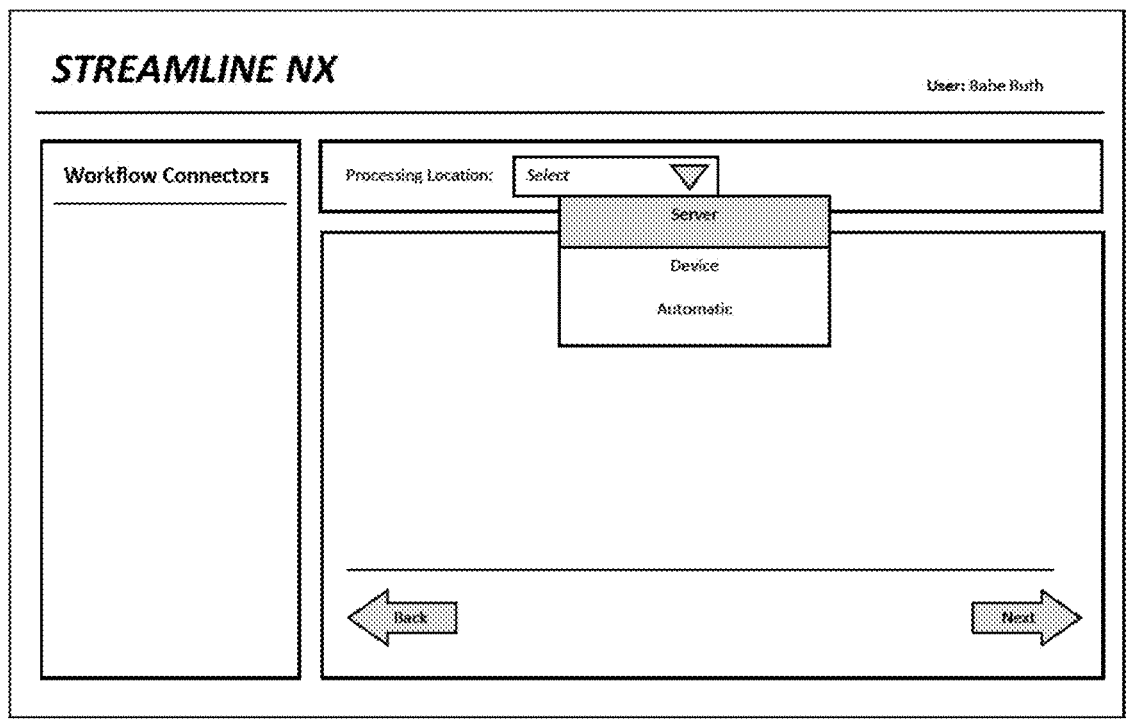
Figures 2, 7E:
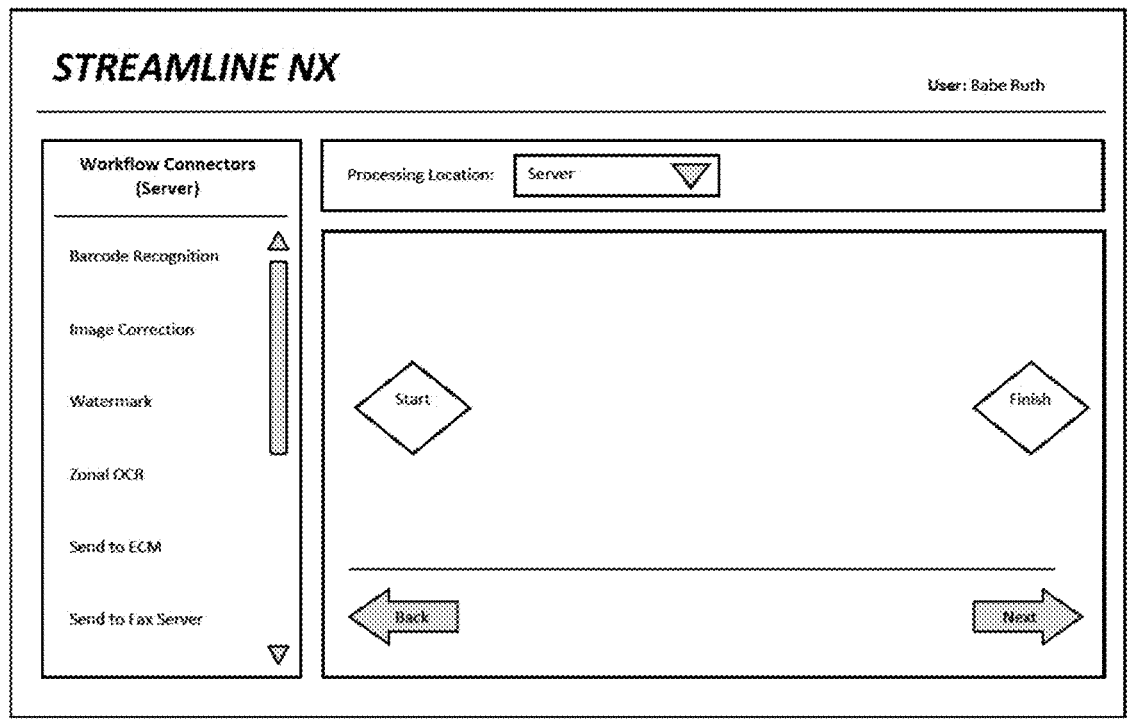
Figures 3, 7E:
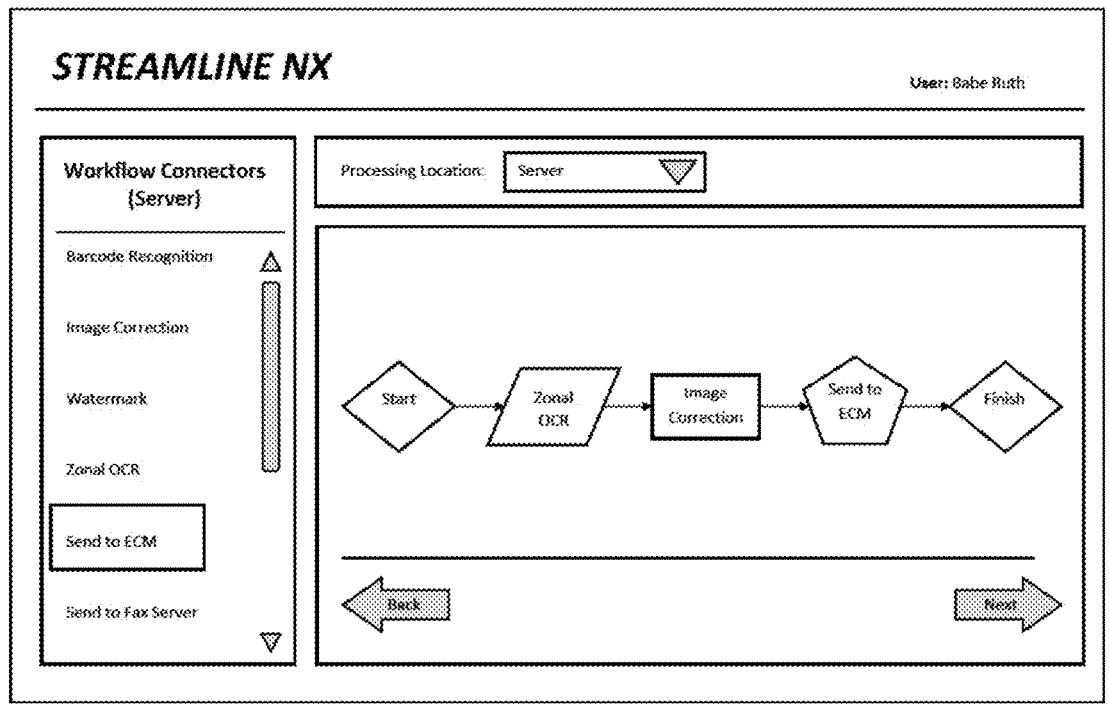

On the other hand, in the case that the user selected to perform processing at the server (e.g., remote processing device) by selecting "Server" from the drop-down menu labeled "Processing Location" (step S604, no), such as shown in FIG. 7E-1, the document workflow application presents the user with all workflow connectors that can be processed by the server (step S610), such as shown in FIG. 7E-2. Next, the user selects a workflow connector which is then added to the workflow (step S611).

In another exemplary embodiment, the workflow profile created by the user may include entirely of workflow connectors that are to be processed only by the server, such as shown in FIG. 7E-3. One example of a reason why the user would rather have the workflow be performed at the server instead of a local device is because the document processing functions that make up the workflow profile may require heavy processing. In other words, a lot of power, resources or time is needed to perform each of the document processing functions in the workflow profile. Thus, it would be better to have a server use its power, resources or time to perform processing for heavy-duty workflow profiles.

Further, it may be that, instead of selecting a workflow profile to be performed entirely at a particular location, the user can let the multi-function document input device decide, when executing the workflow profile, which location is the most suitable for each of the document processing functions to be performed at (step S602 yes). By permitting the multi-function document input device to make the decision, the user is not required to spend time determining which location the document processing functions would be most efficiently processed at. In other words, not all of the document processing functions may be performed at the multi-function document input device or the remote document processing device.

It should be noted that the user of the document workflow application may be a higher level user such as an administrator who has more knowledge regarding information technology than the average person. Thus, such administrator may have a good idea of which devices (e.g., local device, server, etc.) should process which document processing functions (e.g., PDF converter). However, there may be times in which even the administrator does not know which device would be suitable. Thus, administrator may have the local device make the determination instead.

Figures 1, 7F:
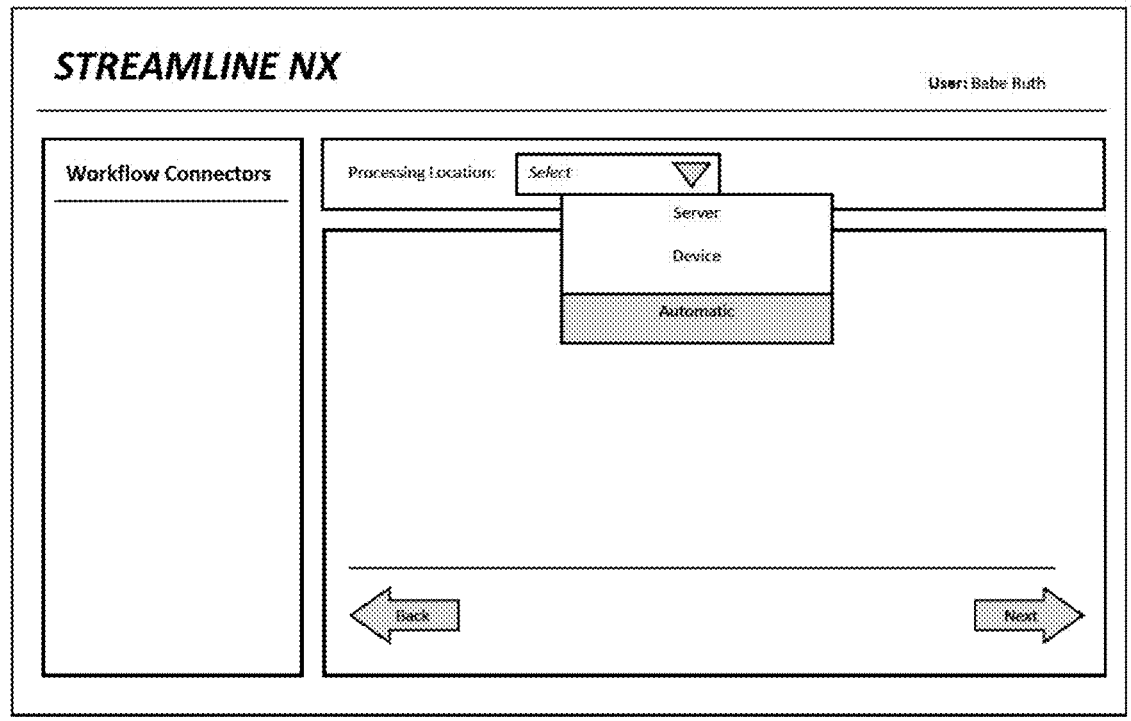
Figures 2, 7F:
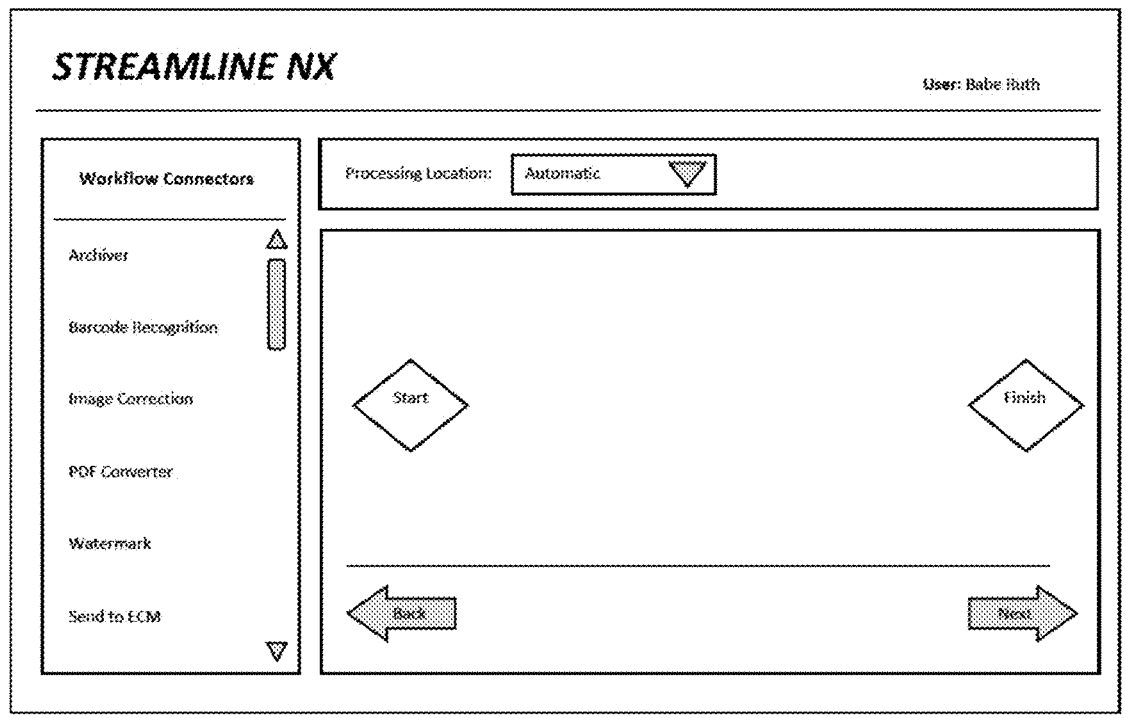
Figures 3, 7F:
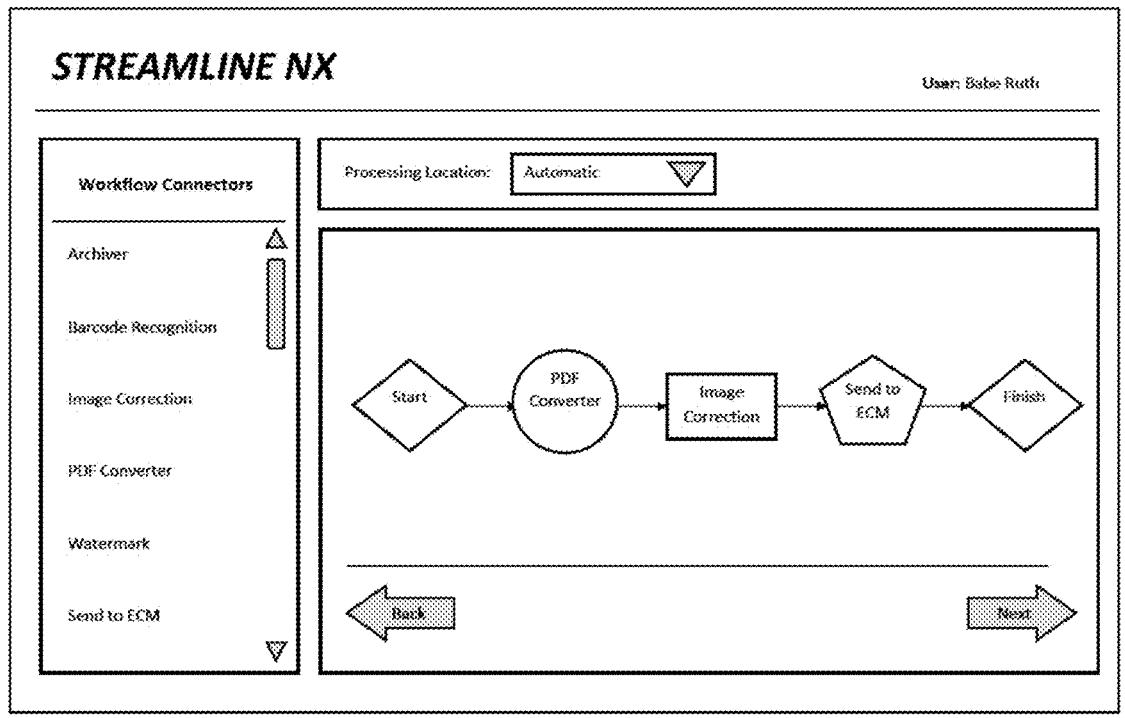

Thus, after the user has selected to have a workflow connector have processing performed "automatically", the user selects "Automatic" in the drop-down menu labeled "Processing Location", such as shown in FIG. 7F-1. In response, the document workflow application displays all workflow connectors to the user (step S607). In other words, the workflow connectors presented to the user are comprised of workflow connectors whose corresponding document processing functions are supportable by both the local device and the server. Next, the user selects a workflow connector which is then added to the workflow (step S608). After selecting the workflow connector, the document workflow application registers the status of the selected workflow connector as "automatic" to notify the device (e.g., local device, server, etc.) that is processing the selected workflow connector to determine a suitable location that can perform the document processing function corresponding to the selected workflow connector (step S609).

In one exemplary embodiment, the workflow connectors presented to the user correspond to every document processing functions that can be processed by the system (e.g., system 100 of FIG. 1 and system 200 of FIG. 2). In other words, the document. workflow application may determine the number of remote document processing devices that (i) can communicate with the multi-function document input device and (ii) perform processing on workflow profiles. Then, the document workflow application presents to the user all the document processing functions that can be processed by the aforementioned remote document processing devices. Thus, the user does not know where the processing is to be performed for each document processing functions. Instead the user knows that the system can perform the document processing functions displayed to the user.

Figure 7G:
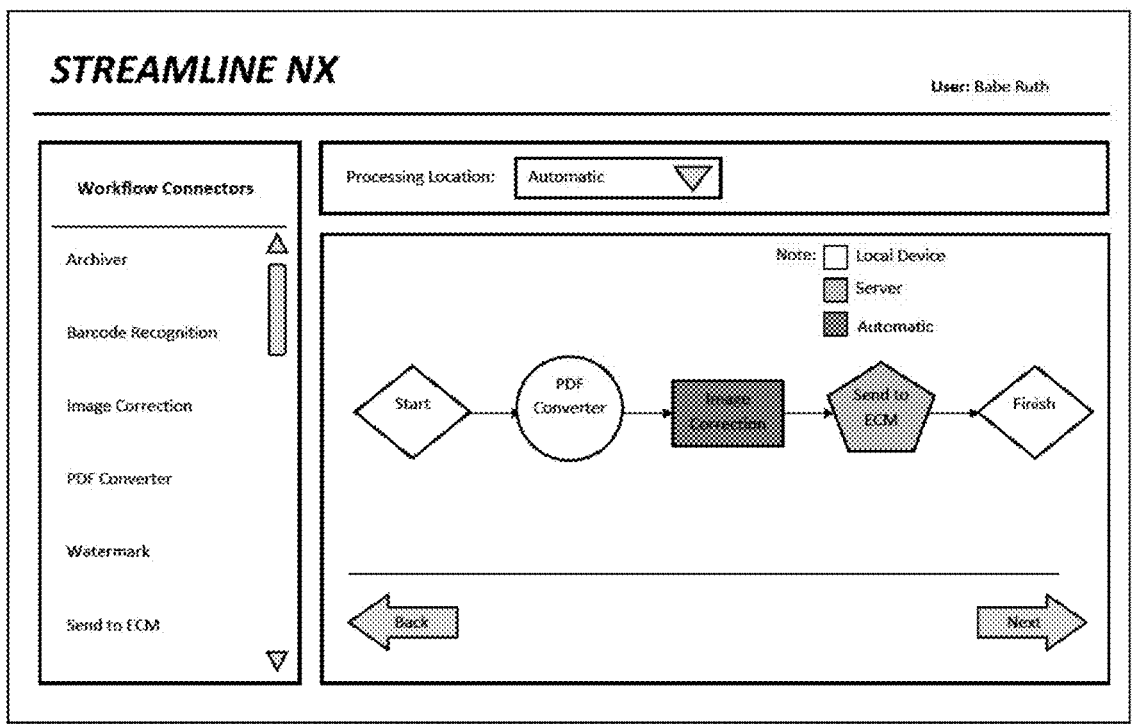

Regardless of whether the user has selected "automatic" for processing or specified a location, once the user has added a single workflow connector to the workflow profile, the document workflow application determines whether the user wishes to add another workflow connector (step S612). In the case that the user does wish to add another workflow connector to the workflow (step S612, yes), the document workflow application repeats the aforementioned process. However, it should be noted that while all of the previous examples show a workflow profile that is of a single class (e.g., only at a server, only at a local device, only "automatic", etc.), this may not necessarily be the case for every workflow profile. In other words, the workflow profile may contain one or more workflow connectors that are processed at a local device, one or more workflow connectors that are processed at a server, and one or more workflow connectors that are processed "automatically", such as shown in FIG. 7G.

In an exemplary embodiment, after the user has added a workflow connector to the workflow and the document workflow application has determined which location the document processing function corresponding to the workflow connector selected is to be processed at or if the workflow connector has a status of "automatic", the document workflow application may assign a color to the workflow connector to identify the location that the corresponding document processing function is processed at or the status of the workflow connector. For example, in FIG. 7G, the workflow connector "PDF converter" is colored white which informs the user that this particular workflow connector function is to be performed at a "local device" or, in other words, the multi-function document input device. In another example, the workflow connector "Image Correction" is colored a shade of dark gray which informs the user that this particular workflow connector function is to be performed at a location determined automatically by the location (e.g., local device, server, etc.) that is processing this particular workflow connector. In yet another example, the workflow connector "Send to ECM" is colored a shade of light gray which informs the user that this particular workflow connector function is to be performed at a server, or, in other words, a remote document processing device".

In another exemplary embodiment, the user may specify in a workflow profile to have workflow connectors that are not sequential with respect to location. In other words, in a workflow profile sequence of "workflow connector 1", "workflow connector 2", "workflow connector 3" (in that order) it may be that "workflow connector 1" is performed at a particular server, "workflow connector 2" is performed at an MFP, and "workflow connector 3" is performed at the particular server. Thus, in such a case, processing may be initially performed at the particular server for "workflow connector 1", then sent to the MFP for "workflow connector 2", then back to the particular server for "workflow connector 3". Thus, there may be a back and forth exchange between locations.

Figure 7H:
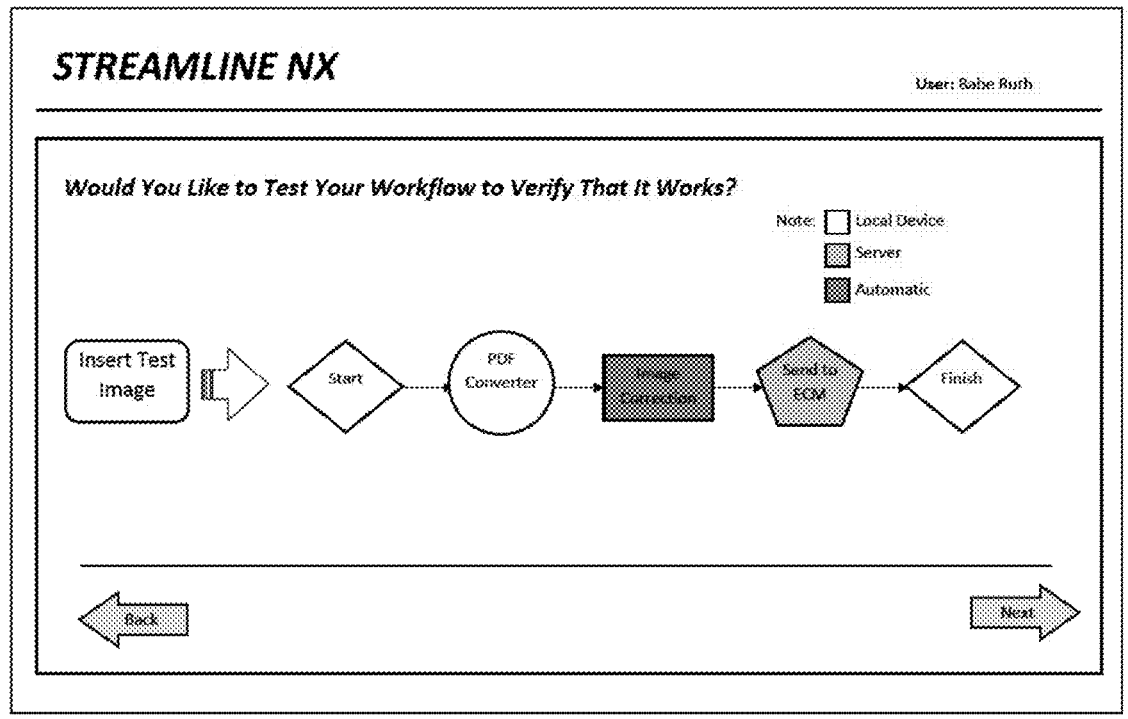

After the user is finished with adding all the desired workflow connectors to the workflow (step S613), the user may be presented with a screen such as shown in FIG. 7H in which the user can validate his or her workflow profile (step S613). In other words, the user can check to see if the workflow profile could operate in real-life without any issues. Such validation can be performed by activating the "Insert Test Image" button, which causes a test document image to be processed by the workflow profile as if the processing was performed in real-life. Stated another way, if the workflow profile included workflow connectors which had processing at a specific local device and at a specific server, then the document workflow application may cause the test image to be sent to the actual specific local device and the actual specific server.

Figure 7I:
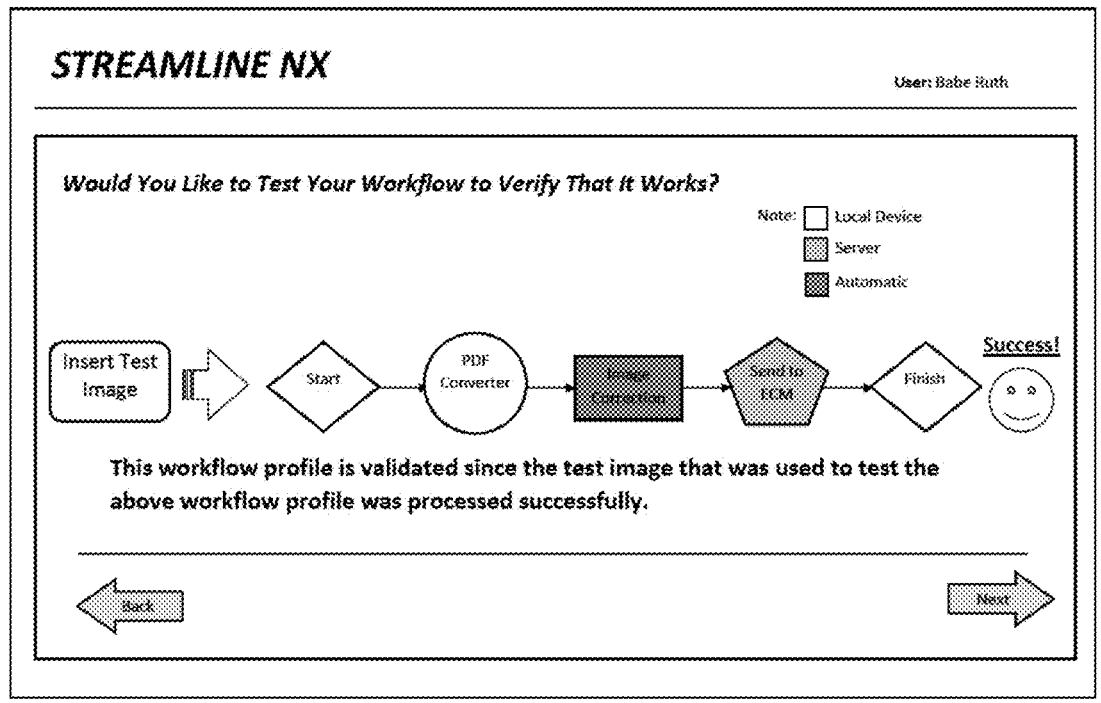
Figure 7J:
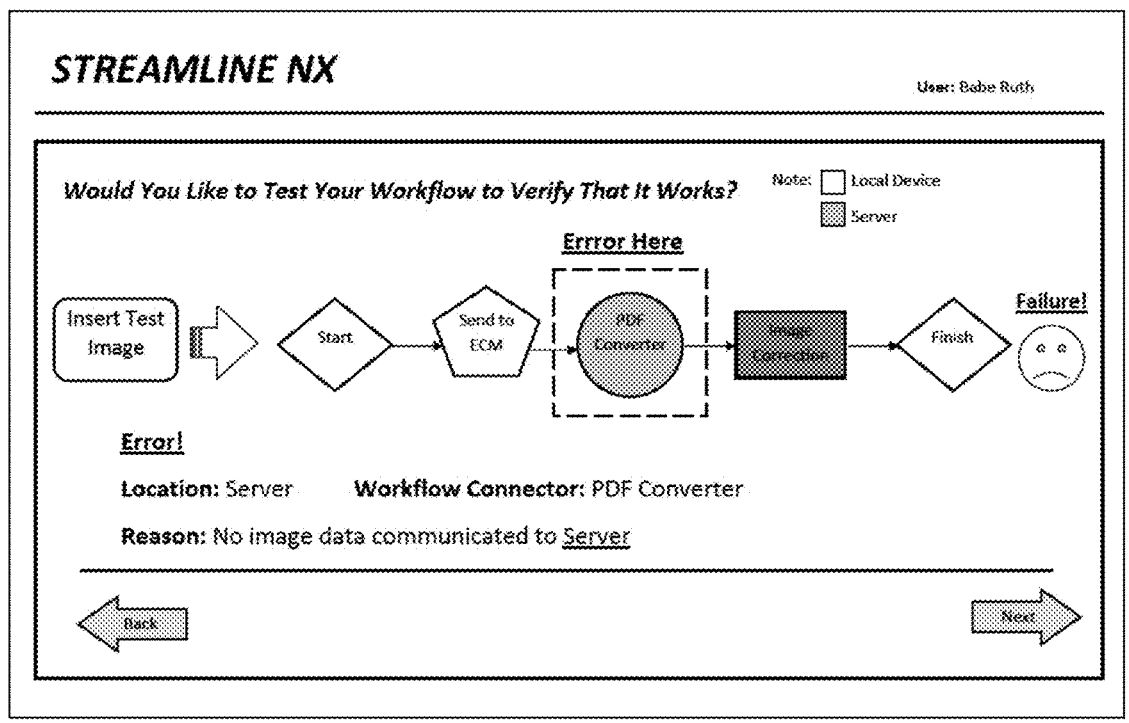

In the case that the processing was successful, the document workflow application outputs a screen to inform the user that the workflow profile has been validated, such as shown in FIG. 7I. On the other hand, in the case that the test was not successful, the document workflow application outputs a screen the inform the user that the workflow profile has not been validated due to an error, such as shown in FIG. 7J. Such screen also may inform the user of the location (e.g., "server", "local device", etc.) the workflow connector that the error occurred at, and a possible reason for the error.

Figure 7K:
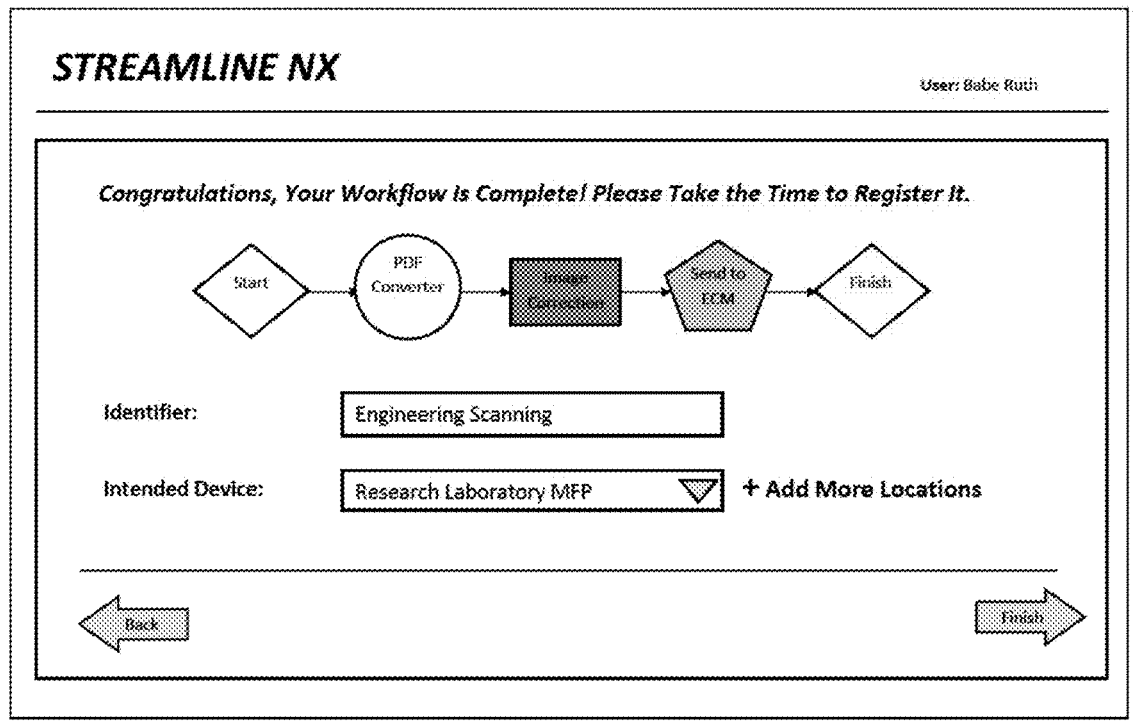

After the user has validated the workflow profile, the document workflow application presents the user with a screen, such as shown in FIG. 7K, in which the user can register the newly created workflow profile by associating an identifier with the workflow profile and storing the workflow profile in the terminal (step S614). Subsequently, the document workflow application may receive from the user an instruction to send the workflow profile to one or more locations that can be accessible by users of a particular multi-function document input device (step S615). For example, the user can add more locations by activating the "Add More Locations" button.

In an exemplary embodiment, the workflow profile does not need to have the workflow connectors for one location be in one group (i.e. consecutive, sequential, etc.). In other words, it is not necessary to have the following sequence, "workflow connector 1" (MFP), "workflow connector 2" (MFP), "workflow connector 3" (server), "workflow connector 4" (server), "workflow connector 5" (server). Instead the workflow connectors may be out of sequence in terms of location. Thus, one example of a sequence of workflow connectors could be "workflow connector 1" (MFP), "workflow connector 2" (server), "workflow connect 3" (MFP), "workflow connector 4" (MFP), "workflow connector 5" (server).

It should be noted that, in an example, when such aforementioned sequence (i.e. non-sequential locations) occurs, the sequence of events that occur may not necessarily be that the MFP performs document processing functions corresponding to "workflow connector 1" (MFP), "workflow connector 3", (MFP) and "workflow connector 4" (MFP) and then sends the processed scanned document image to the server for "workflow connector 2" (server) and "workflow connector 5" (server) to be processed. Instead, the MFP may perform processing of each workflow connector based on the corresponding location. Thus, the MFP firsts performs processing according to "workflow connector 1" (MFP), then send the processed scanned document image to the server for processing of "workflow connector 2" (server), after which, the server sends the processed scanned document image back to the MFP for processing of "workflow connector 3" (MFP) and "workflow connector 4" (MFP), then finally, the MFP sends the scan image to the server for processing of "workflow connector 5" (server).

In another exemplary embodiment, the user may be presented additionally with indicators to indicate a specific device (amongst a group of devices, e.g., local device, server, etc.) at which the workflow connector is to be processed, such as shown in FIG. 7I.

Figure 8:
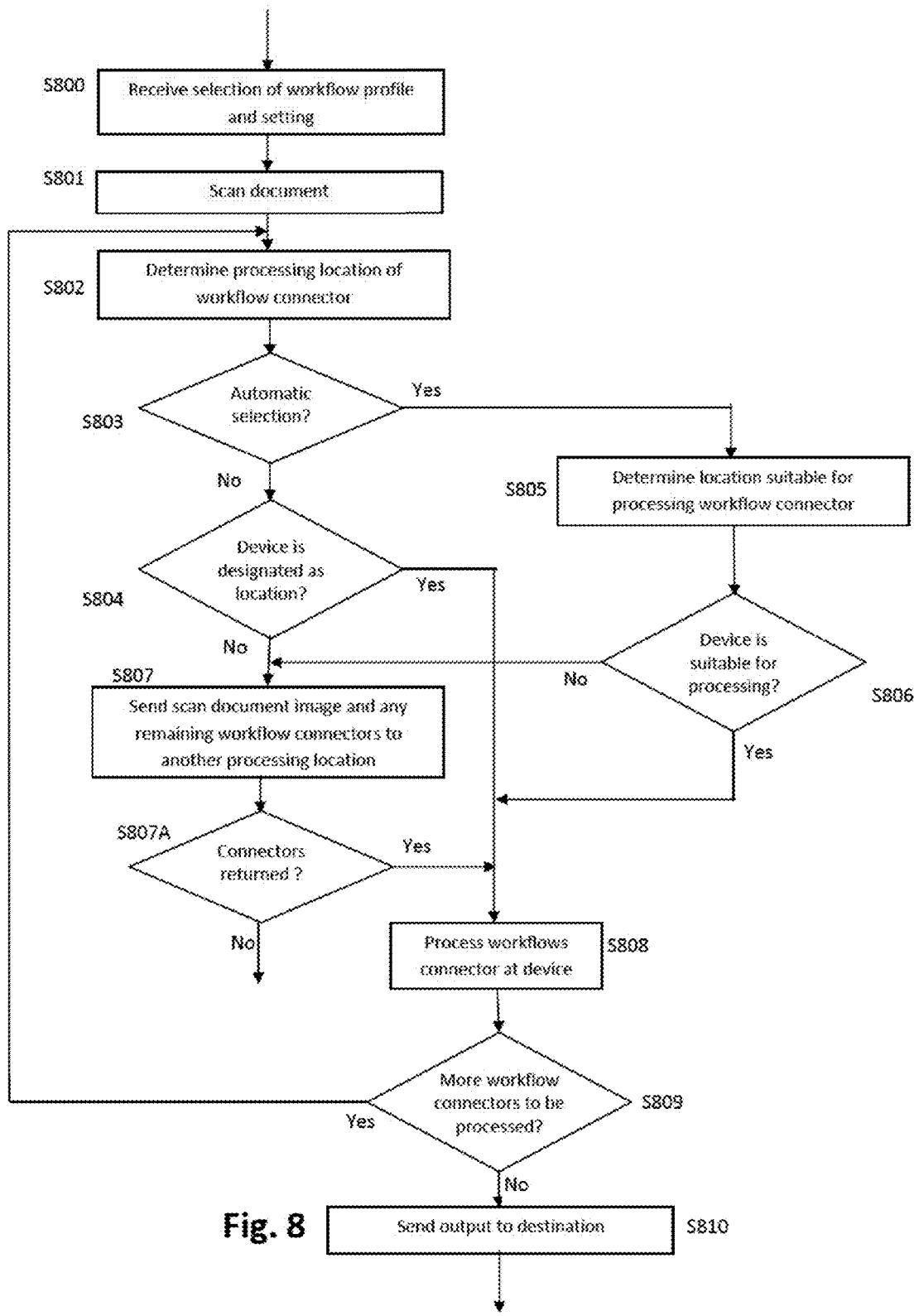
FIG. 8 shows a flow chart of a method that can be performed in the system shown in FIG. 1 or in the system shown in FIG. 2.

FIG. 8 shows a process or method performed by a multi-function document input device (e.g., 102), according to an exemplary embodiment.

Once one or more workflow profiles have been stored in the local device (i.e. multi-function document input device), a user of the local device can access such workflow profiles to perform processing on his or her scanned documents. The user may initially choose settings (e.g., black-and-white or color, type of paper, paper size, output destination etc.) and a workflow profile (step S800). Next, after receiving a physical (i.e. hardcopy) document from the user, the local device scans the physical document into a scanned document image (step S801). Next, the local device examines a workflow connector in the workflow profile to determine a processing location specified in the workflow connector (step S802). In the case that the workflow collector is not set as "automatic" (step S803, no), the local device determines the processing location of the workflow connector (step S804). In the case, that the local device is not the processing location of the workflow connector (step S804, no), the local device sends the scanned document image and any remaining workflow connectors that have not yet been processed to another processing location (step S807). On the other hand, in the case that the workflow connector was set as "automatic" (step S803, yes), the local device determines the best location suitable for processing the workflow connector (step S806). If the local device is not the suitable location (step S806, no), the local device sends the scanned document image and any remaining workflow connectors that have not yet been processed to another processing location (step S807). If the control is returned along with unprocessed connectors, from such other processing location (step S807A, Yes), the returned connectors are processed by the local device (step S808).

However, in either case of the workflow designating the local device as a processing location (step S804, yes) or the local device was deter lined as a suitable processing location (step S806, yes), the local device processed the workflow (step S808). Next, the local device determines if there are any more workflow connectors in the workflow profile to process (step S809). In the case that there are more workflow connectors to process (step S809, yes), process repeats. In the case that there are more workflow connectors to process (step S809, no), the local device may output the completed scan job to a destination specified by a user.

Figure 9:
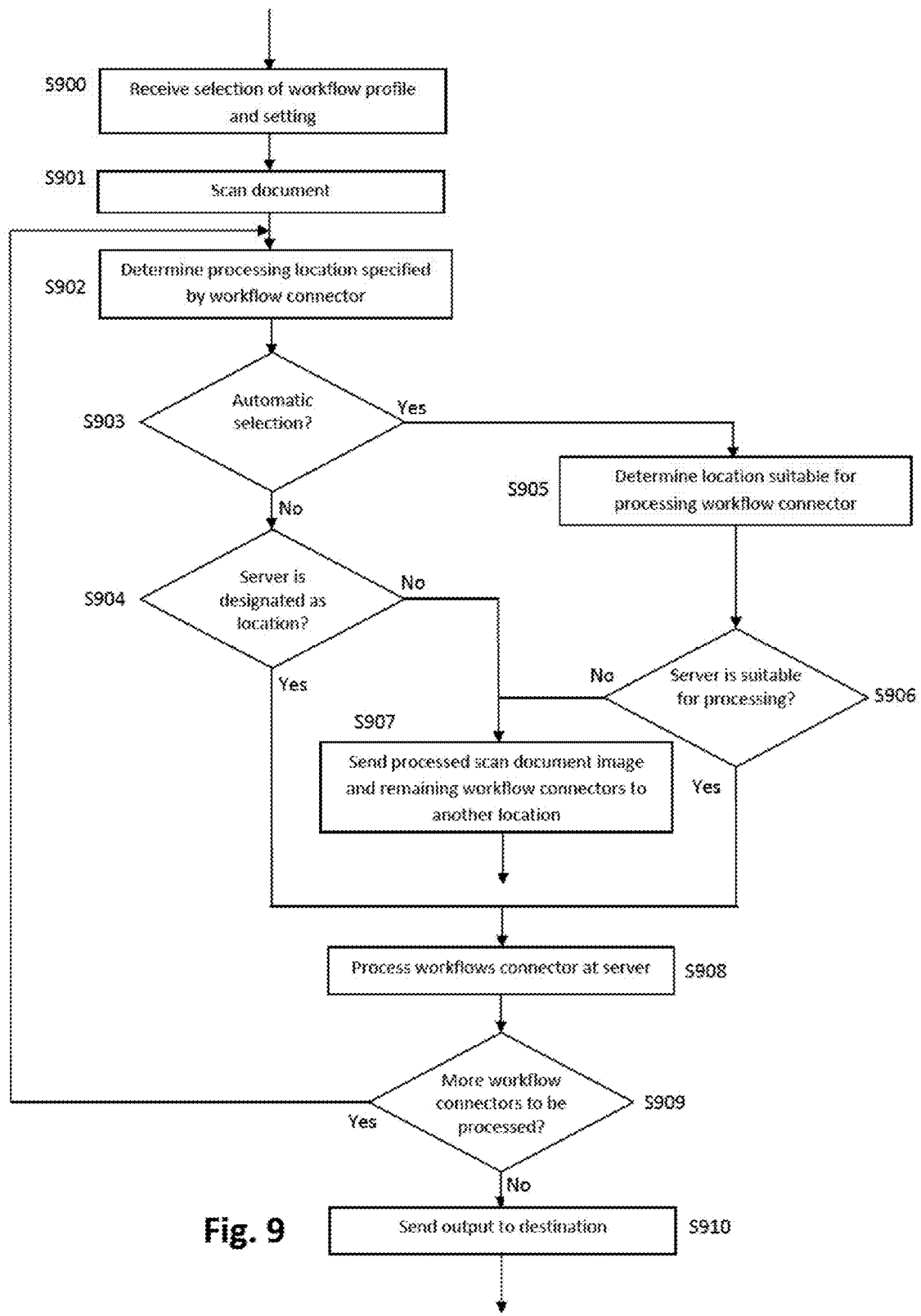
FIG. 9 shows a flow chart of a method that can be performed in the system shown in FIG. 1 or in the system shown in FIG. 2.

FIG. 9 shows a process or method performed by a multi-function document input device e.g., 102), according to an exemplary embodiment.

Once one or more workflow profiles have been stored in the local device (i.e. multi-function document input device), a user of the local device can access such workflow profiles to perform processing on his or her scanned documents. The user may initially choose settings (e.g., black-and-white or color, type of paper, paper size, output destination etc.) and a workflow profile (step S900). Next, after receiving a physical (i.e. hardcopy) document from the user, the local device scans the physical document into a scanned document image (step S901). Next, the local device examines a workflow connector in the workflow profile to determine a processing location specified in the workflow connector (step S902). In the case that the workflow connector is not set as "automatic" (step S903, no), the local device determines the processing location of the workflow connector (step S904). In the case, that a server is not the processing location of the workflow connector (step S904, no), the local device sends the scanned document image and any remaining workflow connectors that have not yet been processed to another processing location (step S907). On the other hand, in the case that the workflow connector was set as "automatic" (step S903, yes), the local device determines the best location suitable for processing the workflow connector (step S906). If the server is not the suitable location (step S906, no), the local device sends the scanned document image and any remaining workflow connectors that have not yet been processed to another processing location (step S907).

However, in either case of the workflow designating the server as a processing location (step S904, yes) or the server was determined as a suitable processing location (step S906, yes), the server processed the workflow (step S908). Next, the local device determines if there are any more workflow connectors in the workflow profile to process (step S909). In the case that there are more workflow connectors to process (step S909, yes), process repeats. In the case that there are more workflow connectors to process (step S909, no), the server may output the completed scan job to a destination specified by a user.

Figure 10:
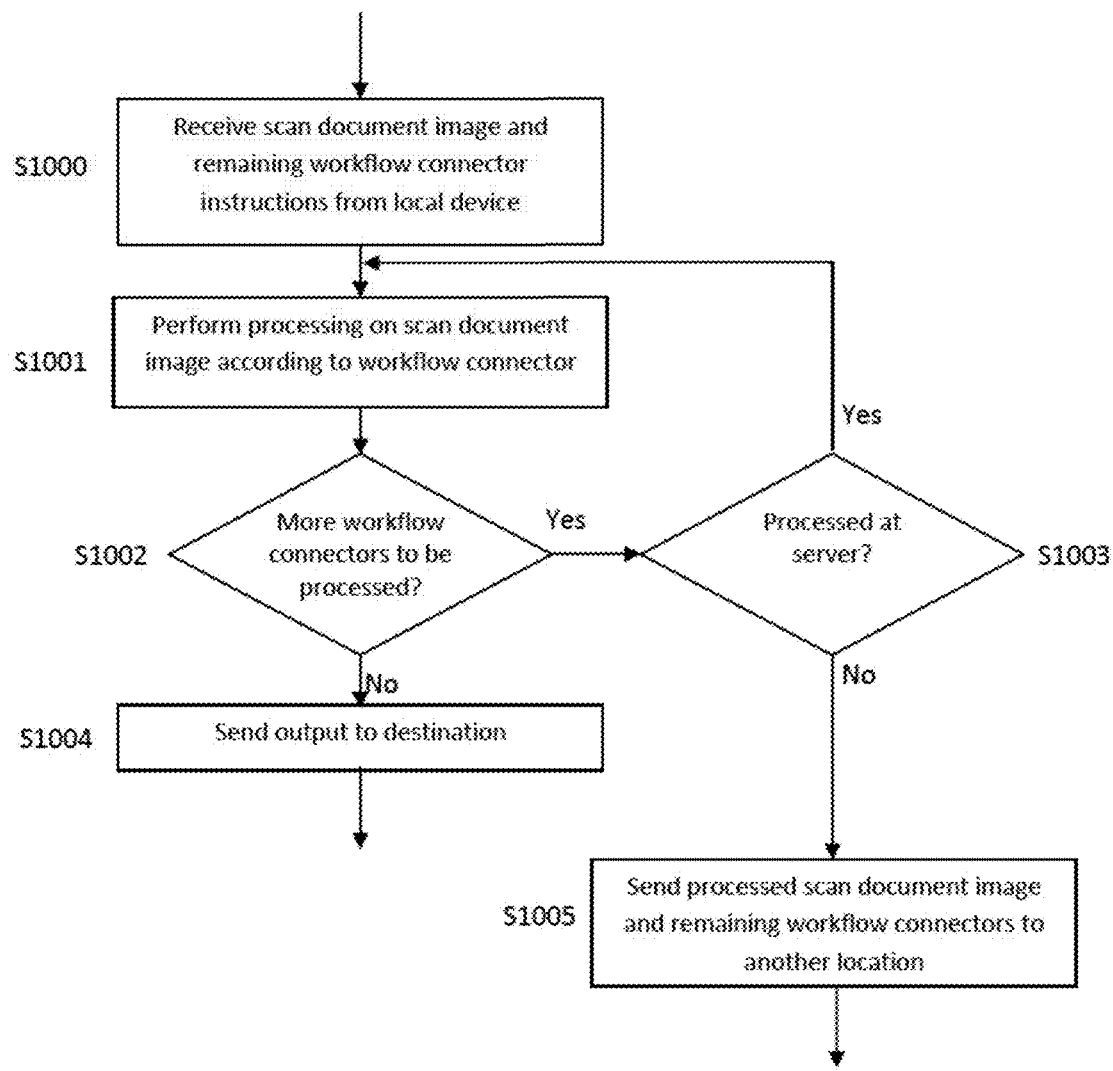
FIG. 10 shows a flow chart of a method that can be performed in the system shown in FIG. 1 car in the system shown in FIG. 2.

FIG. 10 shows a process or method performed by a remote document processing device (e.g., 103), according to an exemplary embodiment.

It may be that either (i) one or more of the workflow connectors in the workflow profile selected by the user of the local device specifies a processing location other than the local device or (ii) none of the workflow connectors in the selected workflow profile specifies the local device as a processing location. In either case, the local device sends the scanned document image and remaining workflow connector instructions to be received by a server (e.g., remote document processing device) (step S1000). Next, the server performs processing on the scanned document image according to a workflow connector in the workflow connector instructions sent by the local device (step S1001). Then, the server determines if there are any workflow connectors remaining that have yet to be process (step S1002). In the ease that there are no more workflow connectors to be processed (step S1002, no), the server may output the completed scan job to a destination specified by a user (step S1004). On the other hand, in the case that there are one or more workflow connectors to be processed (step S1002, yes), the server determines whether the next workflow connector to be processed is to be performed at the server or another location (step S1003). In the case that the next workflow connector is to be performed at the server (step S1003, yes), the process repeats. Otherwise, in the case that the next workflow connector is not to be performed at the server (step S1003, no), the server sends the scanned document image and any remaining workflow connectors that have not yet been processed to another processing location (step S1005).

Figure 11:
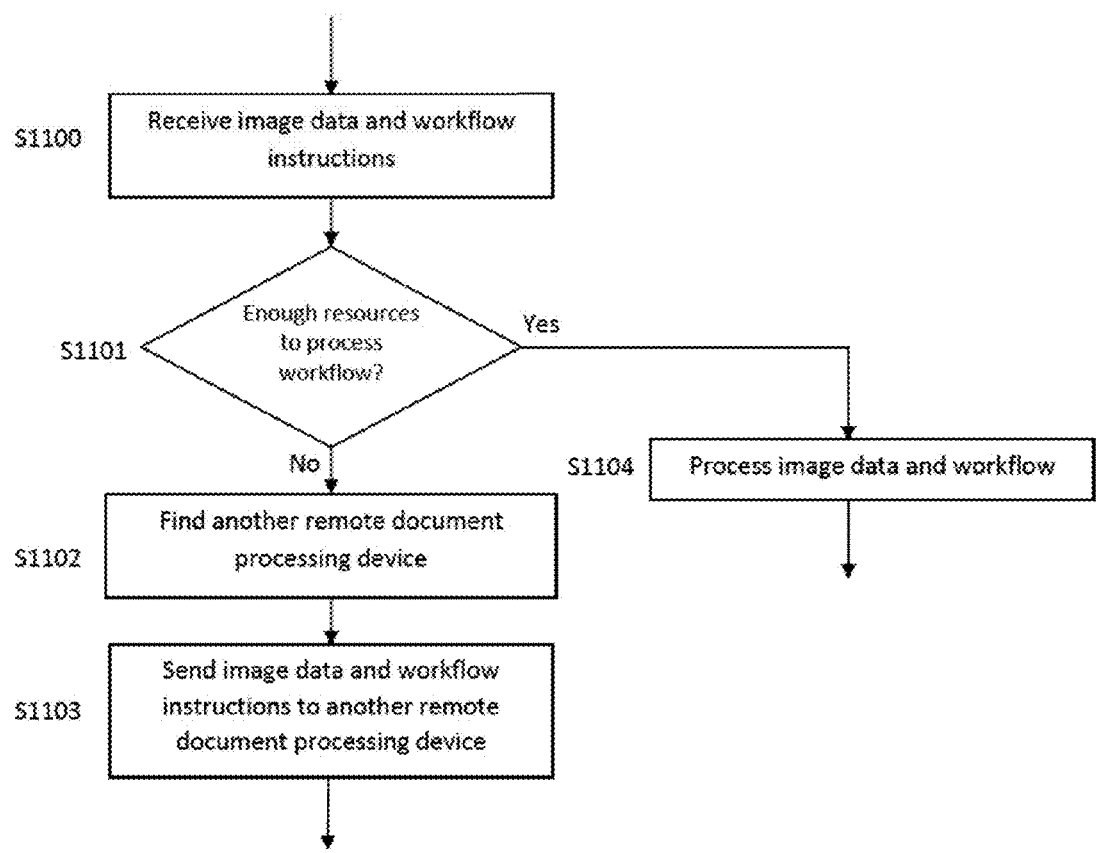
FIG. 11 shows a flow chart of a method that can be performed in the system shown in FIG. 1 or in the system shown in FIG. 2.

FIG. 11 shows a process or method performed by a remote document processing device (e.g., 103), according to an exemplary embodiment.

After receiving image data and an instruction to perform a workflow (step S1100), the remote document processing device may determine whether it has enough resources to process the workflow (step S1101). In other words, it may be that the remote document processing device may already be processing other workflows simultaneously and, therefore, does not have the capacity or resources to process any more workflows. Thus, in the case that the remote document processing device does not have enough resources (step S1101, no), the remote document processing device finds another remote document processing device that can process the workflow (step S1102). Once another remote document processing device is found, the remote document processing device sends image data and corresponding workflow to it (step S1103). Otherwise, if the remote document processing device has enough resources, it processes the workflow profile (step S1104).

Figure 12:
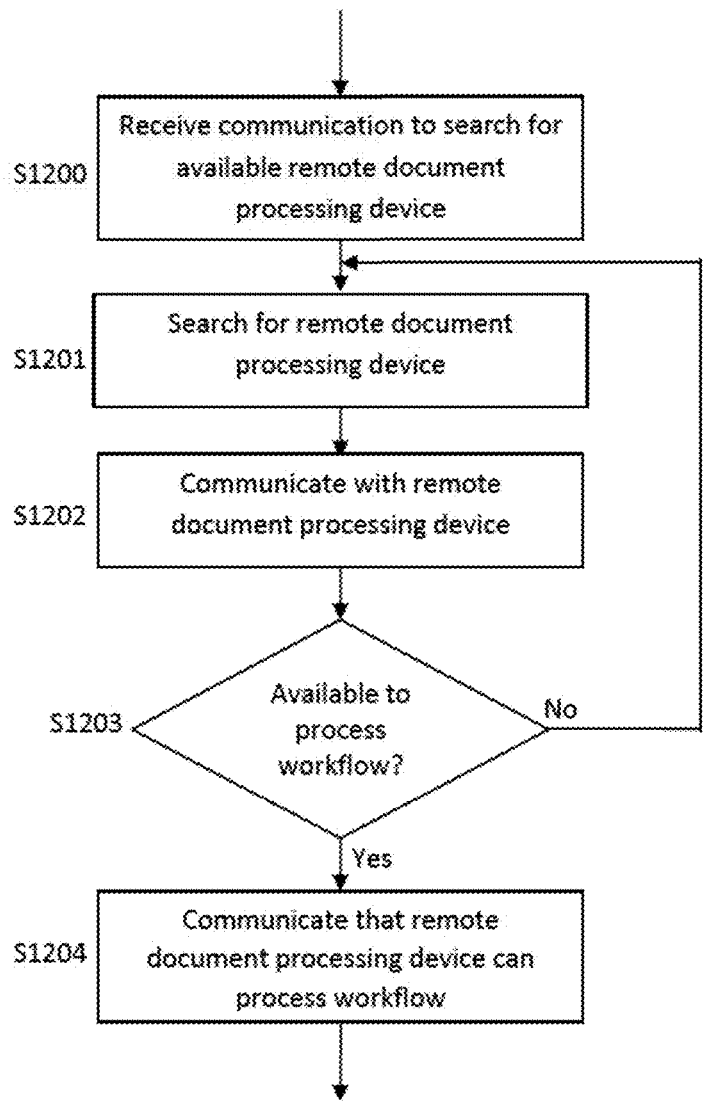
FIG. 12 shows a flow chart of a method that can be performed in the system shown in FIG. 2.

FIG. 12 shows a process or method performed by a server (e.g., 104 in FIG. 2), according to an exemplary embodiment.

In a network, there may be a plurality of remote document processing devices (e.g., remote document processing device 103). As a result, when a user of the multi-function document input device (e.g., multi-function document input device 102) selects a workflow that is to be processed by a remote document processing device, the multi-function document input device may have a variety of remote document processing devices to select from. However, some of the remote document processing devices may be unavailable (e.g., busy, offline, malfunctioning, etc.). As a result, the multi-function document input device may communicate with a primary server to determine which remote document processing device is available.

Thus, after the primary server receives a communication from the multi-function document input device to search for an available remote document processing device (step S1200), the primary serve performs a search (step S1201). After the primary server discovers a particular remote document processing device, the primary server performs communication with the particular remote document processing device (step S1202). Next, the primary determines whether the particular remote document processing device is available to process the workflow (step S1203). If the particular remote document processing device is not available (step S1203, no), the primary server starts another search. Otherwise (step S1203, yes), the primary server communicates to the multi-function document input device that the primary server has discovered a particular remote document processing device that can process the workflow thereby causing the m function document input device to send image data and workflow instructions to the particular multi-function document input device (step S1204).

The orders in which the steps are performed in the aforementioned methods are not limited to those shown in the examples of FIGS. 6 and 8-12, and may be switched as long as similar results are achieved. Also, it should be noted that the methods or processes illustrated in the examples of FIGS. 6 and 8-12 may be implemented using any of the systems described in connection with FIGS. 1 and 2.

The aforementioned specific embodiments are illustrative, and many variations can be introduced on these embodiments without departing from the spirit of the disclosure or from the scope of the appended claims. For example, various aspects, features and advantages disclosed herein can applied to automate device driver installation, even when the device for which the driver is needed does not have any print functionality. Further, although the aspects, features and advantages are discussed herein in connection with a document workflow application, it should be understood that such aspects and feature may be integrated in a program that is not application software per se, but may be instead, for example, an operating system, a snap-in, a plug-in, an add-on, an extension, or another program not normally referenced as an application.

In addition, elements and/or features of different examples and illustrative embodiments may be combined with each other and/or substituted for each other within the scope of this disclosure and appended claims.

What is claimed is:

1. A document processing system including provisions to execute a document workflow for scan document processing, the system comprising:
   a workflow application embodied in a non-transitory storage medium and executable by a processor of a terminal apparatus to provide a workflow creation interface, for an administrator to create and register one or more workflow profiles via the workflow application, the workflow creation interface including a processing location selector to receive selection by the administrator of (i) a processing location amongst plural processing locations or (ii) automatic determination, wherein
   when the processing location is selected, from amongst the plural processing locations and via the workflow creation interface, the workflow creation interface displays selectable workflow connectors that can be processed by the selected processing location, and
   when the automatic determination is selected via the workflow creation interface, the workflow creation interface displays all candidate workflow connectors that can be processed by the plural processing locations and the workflow creation interface permits selection, to be associated with the automatic determination, one or more workflow connectors amongst said all candidate workflow connectors, and
   the workflow creation interface permits selection of two or more workflow connectors amongst the displayed selectable workflow connectors and to connect sequentially (a) one workflow connector with a first document processing device as a processing location associated with the one workflow connector to (b) another workflow connector in which the processing location thereof is a second document processing device that is connected to the first document processing device through a network, and to register a workflow profile including the one workflow connector connected to said another workflow connector, and
   in the workflow profile registered via the workflow application, the processing location associated with a first workflow connector is either of (i) the first document processing device or (ii) the second document processing device, the processing location associated with a next workflow connector is the other of (i) or (ii), and the processing location of another workflow connector subsequent to said next workflow connector in the workflow profile is the processing location of the first workflow connector; and
   a multi-function document input device, including:
     a document scanner to scan a hardcopy document and generate a scanned document image, and submit the scanned document image for further processing according to a selected workflow profile; and
     a workflow distributor that, when a specified workflow connector in the selected workflow profile is associated with a specified processing location, distributes the scanned document image and the specified workflow connector in the selected workflow profile to the specified processing location for processing by the specified processing location, and when the specified workflow connector in the selected workflow profile is associated with the automatic determination, and the workflow distributor performing the automatic determination determines, without the administrator or any user specifying, that another processing location amongst the plural processing locations for executing the specified workflow connector is a suitable processing location, the workflow distributor of the multi-function document input device distributes the scanned document image and the specified workflow connector in the selected workflow profile to said another processing location for processing.

2. The document processing system as claimed in claim 1, wherein after the scanned document image is processed by the first document processing device, the processed document image is transmitted along with the remaining unprocessed workflow connectors registered in the workflow profile via the workflow application through the network to the second document processing device.

3. The document processing system as claimed in claim 1, further comprising:
   a remote document processing device including local storage, one or more processors and a communication interface to receive document images and processing commands,
   wherein the plural processing locations include the multi-function document input device and the remote document processing device,
   wherein the remote document processing device is connected to the multi-function document input device through a network, and the remote document processing device has greater workflow processing capacity than that of the multi-function document input device, and
   wherein the processing location of at least one workflow connector of the workflow profile registered via the workflow application is the multi-function document input device, and the processing location of another workflow connector registered in the workflow profile is the remote document processing device.

4. The document processing system as claimed in claim 3, wherein
   the workflow profile registered via the workflow application includes a transition from (i) a connected workflow connector having the multi-function document input device as the processing location to (ii) next connected workflow connector having the remote document processing device as the processing location.

5. The document processing system as claimed in claim 3, wherein
   the workflow profile registered via the workflow application includes a transition from (i) a connected workflow connector having the remote document processing device as the processing location to (ii) next connected workflow connector having the multi-function document input device as the processing location.

6. The document processing system as claimed in claim 1, further comprising:
   a remote document processing device including local storage, one or more processors and a communication interface to receive document images and commands,
   wherein the plural processing locations include the multi-function document input device and the remote document processing device,
   wherein the remote document processing device is connected to the multi-function document input device through a network, and the remote document processing device has greater workflow processing capacity than that of the multi-function document input device, and wherein the processing location of all of the selectable workflow connectors of at least one workflow profile amongst the one or more workflow profiles registered via the workflow application is the multi-function document input device, and the processing location of all of the selectable workflow connectors of another workflow profile amongst the one or more workflow profiles registered via the workflow application is the remote document processing device.

7. The document processing system as claimed in claim 1, wherein the multi-function document input device further includes, in addition to the document scanner, a local document flow engine to process scanned document images, and when the multi-function document input device is selected as the processing location through the processing location selector of the workflow creation interface, the workflow creation interface displays only the selectable workflow connectors that can be processed by the local document flow engine of the multi-function document input device.

8. The document processing system as claimed in claim 1, wherein the multi-function document input device further includes, in addition to the document scanner, a local document flow engine to process scanned document images, and when the workflow distributor distributes a scanned document image set to the multi-function document input device as the processing location of the selected workflow profile, all of the connected workflow connectors of the selected workflow profile are executed by the local document flow engine.

9. The document processing system as claimed in claim 1, wherein the terminal apparatus is configured to operate as a remote document processing device to receive a scanned document image set from the workflow distributor and process the document image set received from the workflow distributor according to the selected workflow profile or one or more workflow connectors.

10. A document workflow application including one or more programs of instructions embodied in a non-transitory computer readable medium and executable by a processor of a terminal apparatus to generate a document workflow for scan document delivery, wherein the document workflow application executable by the processor comprises:

a workflow creation interface, for an administrator, to create and register one or more workflow profiles via the workflow application, the workflow creation interface including a processing location selector to receive selection by the administrator of (i) a processing location amongst plural processing locations or (ii) automatic determination, wherein when a processing location is selected via the workflow creation interface, the workflow creation interface displays selectable workflow connectors that can be processed by the selected processing location, and when the automatic determination is selected via the workflow creation interface, the workflow creation interface displays all candidate workflow connectors, and the workflow creation interface permits selection, to be associated with the automatic determination, one or more workflow connectors amongst said all candidate workflow connectors, and when an associated workflow connector amongst the workflow connectors associated with the automatic determination is being processed by a document processing device and the document processing device determines that another processing location other than the document processing device is a suitable processing location for the associated workflow connector, the document processing device distributes the associated workflow connector to said another processing location that is a suitable processing location for the associated workflow connector, and wherein the workflow creation interface permits the administrator to select two or more workflow connectors amongst the displayed workflow connectors and to connect sequentially (a) one workflow connector with a first document processing device as a processing location associated with the one workflow connector to (b) another workflow connector in which the processing location thereof is a second document processing device that is connected to the first document processing device through a network, and to register a workflow profile including the one workflow connector connected to said another workflow connector, and in the workflow profile registered via the workflow application, the processing location associated with a first workflow connector is either of (i) the first document processing device or (ii) the second document processing device, the processing location associated with a next workflow connector is the other of (i) or (ii), and the processing location of another workflow connector subsequent to said next workflow connector in the workflow profile is the processing location of the first workflow connector.

11. The document workflow application as claimed in claim 10, further comprising:

a workflow validation module to test the workflow profile including distributing a test document image to the first document processing device for processing based on the one workflow connector, and cause the processed test document image to be transmitted through the network to the second document processing device for processing based on said another workflow connector.

12. The document workflow application as claimed in claim 10, wherein the plural processing locations include:

a multi-function document input device including a document scanner to scan a hardcopy document and generate a scanned document image; and a remote document processing device coupled to the multi-function document input device via a network, and the remote document processing device has greater workflow processing capacity than that of the multi-function document input device, and wherein when the multi-function document input device is selected as the processing location through the processing location selector, the workflow creation user interface displays only the selectable workflow connectors that can be processed by the multi-function document input device, when the remote document processing device is selected as the processing location through the processing location selector, the workflow creation user interface displays only selectable workflow connectors that can be processed by the remote document processing device.

13. The document workflow application as claimed in claim 12,
wherein the workflow profile registered via the workflow application includes a transition from (i) a connected workflow connector having the multi-function document input device as the processing location to (ii) next connected workflow connector having the remote document processing device as the processing location.

14. The document workflow application as claimed in claim 12,
wherein the workflow profile registered via the workflow application includes a transition from (i) a connected workflow connector having the remote document processing device as the processing location to (ii) next connected workflow connector having the multi-function document input device as the processing location.

15. The document workflow application as claimed in claim 12,
wherein the processing location of all of the selectable workflow connectors of at least one workflow profile amongst the workflow profiles registered via the workflow application is the multi-function document input device, and the processing location of all selectable workflow connectors of another workflow profile amongst the workflow profiles registered via the workflow application is the remote document processing device.

16. The document workflow application as claimed in claim 12,
wherein the processing location of at least one workflow connector of the workflow profile registered via the workflow application is the multi-function document input device, and the processing location of another workflow connector of the workflow profile via the workflow application is the remote document processing device.

17. A method performed by a document processing system configured with provisions to execute a document workflow for scan document processing, the document processing system including (i) a multi-function document input device including a document scanner to scan a hardcopy document and generate a scanned document image, and (ii) a remote document processing device coupled to the multi-function document input device via a network, the remote document processing device having greater workflow processing capacity than that of the multi-function document input device, the method comprising:

(a) registering a workflow profile constituted by a specified combination of plural workflow connectors connected sequentially, wherein a processing location of at least one workflow connector of the registered workflow profile is the multi-function document input device, the processing location of another workflow connector of the registered workflow profile is the remote document processing device, and the processing location of an additional workflow connector of the registered workflow profile is associated with an automatic determination;

(b) scanning a hardcopy document, by the document scanner of the multi-function document input device, and generating a scanned document image set, by the multi-function document input device;

(c) receiving an instruction to process the scanned document image set according to the registered workflow profile, and processing the scanned document image set, according to the sequentially connected workflow connectors; and (d) transmitting from the multi-function document input device to the remote document processing device the processed scanned document image set processed in (c) and remaining unprocessed workflow connectors of the registered workflow profile, when the processing location of a next workflow connector, not yet processed, is the remote document processing device;

(e) further processing according to one or more of the remaining workflow connectors the processed scanned document image set received by the remote document processing device in (d) and transmitting from the remote document processing device back to the multi-function document input device the further processed scanned document image set; and (f) performing the automatic determination, when the additional workflow connector associated with the automatic determination is being processed and without any user or administrator specifying any processing location for the additional workflow connector, to determine that another processing location amongst the plural processing locations for executing the additional workflow connector is a suitable processing location, and distributing the processed document image set to said another processing location for processing.

* * * * *